US010341973B2

(12) United States Patent
Yu et al.

(10) Patent No.: US 10,341,973 B2
(45) Date of Patent: Jul. 2, 2019

(54) DETERMINING REFERENCE FRAME INFORMATION IN A TELECOMMUNICATION NETWORK

(71) Applicant: HUAWEI TECHNOLOGIES CO., LTD., Shenzhen, Guangdong (CN)

(72) Inventors: Feng Yu, Beijing (CN); Yinghui Yu, Beijing (CN); Lei Liu, Shanghai (CN); Han Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/816,969

(22) Filed: Nov. 17, 2017

(65) Prior Publication Data

US 2018/0098297 A1    Apr. 5, 2018

Related U.S. Application Data

(63) Continuation of application No. PCT/CN2015/086071, filed on Aug. 4, 2015.

(30) Foreign Application Priority Data

May 19, 2015 (WO) ................ PCT/CN2015/079312

(51) Int. Cl.
*H04W 56/00* (2009.01)
*H04W 68/00* (2009.01)
(Continued)

(52) U.S. Cl.
CPC ... *H04W 56/0015* (2013.01); *H04W 52/0216* (2013.01); *H04W 52/0219* (2013.01);
(Continued)

(58) Field of Classification Search
CPC ......... H04W 56/0015; H04W 52/0216; H04W 52/0219; H04W 56/00; H04W 68/005; H04W 76/28; H04W 88/08
See application file for complete search history.

(56) References Cited

U.S. PATENT DOCUMENTS

2002/0151306 A1* 10/2002 Ohtani ................. H04B 7/022
455/436
2006/0116136 A1    6/2006 Noma
(Continued)

FOREIGN PATENT DOCUMENTS

CN       1988698 A     6/2007
CN     102340794 A     2/2012
(Continued)

OTHER PUBLICATIONS

Extended European Search Report issued in European Application No. 15892323.5 dated Apr. 19, 2018, 8 pages.
(Continued)

*Primary Examiner* — Pakee Fang
(74) *Attorney, Agent, or Firm* — Fish & Richardson P.C.

(57) ABSTRACT

Embodiments of the present invention disclose a paging method, a core network device, a base station, and user equipment. The method includes: determining, by the core network device, reference frame information when the core network device determines that a synchronization occasion arrives, where the reference frame information includes a radio frame number; and sending, by the core network device, the reference frame information to a base station in a paging area, so that the base station synchronizes a radio frame in the base station according to the reference frame information. The embodiments of the present invention can reduce problems that UE cannot listen for a paging message.

12 Claims, 6 Drawing Sheets

(51) Int. Cl.
*H04W 52/02* (2009.01)
*H04W 76/28* (2018.01)
*H04W 88/08* (2009.01)

(52) U.S. Cl.
CPC ......... *H04W 56/00* (2013.01); *H04W 68/005* (2013.01); *H04W 76/28* (2018.02); *H04W 88/08* (2013.01); *Y02D 70/00* (2018.01); *Y02D 70/1224* (2018.01); *Y02D 70/1262* (2018.01); *Y02D 70/20* (2018.01); *Y02D 70/21* (2018.01); *Y02D 70/24* (2018.01)

(56) References Cited

U.S. PATENT DOCUMENTS

| | | |
|---|---|---|
| 2011/0136530 A1 | 6/2011 | Deshpande et al. |
| 2011/0268018 A1 | 11/2011 | Wang et al. |
| 2013/0012249 A1 | 1/2013 | Centonza et al. |
| 2017/0201306 A1* | 7/2017 | Shimezawa .......... H04B 17/345 |

FOREIGN PATENT DOCUMENTS

| | | |
|---|---|---|
| CN | 102640544 A | 8/2012 |
| CN | 103533630 A | 1/2014 |
| EP | 1571856 A1 | 9/2005 |
| JP | H1051846 A | 2/1998 |
| JP | H11196447 A | 7/1999 |
| JP | 2002533990 A | 10/2002 |
| JP | 2004194015 A | 7/2004 |
| JP | 2010502057 A | 1/2010 |
| JP | 2010028228 A | 2/2010 |
| JP | 2014522147 A | 8/2014 |
| WO | 0038361 A2 | 6/2000 |
| WO | 2014090294 A1 | 6/2014 |
| WO | 2014185538 A1 | 11/2014 |

OTHER PUBLICATIONS

International Search Report in International Application No. PCT/CN2015/086071, dated Feb. 19, 2016, 8 pages.
R2-152172 Intel Corporation,"Extending DRX cycle impacts and solutions for idle mode",3GPP TSG RAN WG2 Meeting #90 ,Fukuoka, Japan, May 25-29, 2015,total 6 pages.
Japanese Office Action issued in Japanese Application No. 2017-560312 dated Nov. 27, 2018, 9 pages.

* cited by examiner

DETERMINING REFERENCE FRAME INFORMATION IN A TELECOMMUNICATION NETWORK

CROSS-REFERENCE TO RELATED APPLICATIONS

This application is a continuation of International Application No. PCT/CN2015/086071, filed on Aug. 4, 2015, which claims priority to International Application No. PCT/CN2015/079312, filed on May 19, 2015. All of the aforementioned patent applications are hereby incorporated by reference in their entireties.

TECHNICAL FIELD

The present invention relates to the field of communications technologies, and in particular, to a paging (Paging) method, user equipment, a base station, and a core network device.

BACKGROUND

Machine-to-machine (M2M) information and data exchange between machines over a wireless network, and is an important direction for next-stage development of mobile communications. The M2M is widely applied to many fields that include intelligent transportation, a building control system, a smart home control system, a video surveillance system, industrial monitoring, and the like.

In an M2M system, when downlink data in a core network needs to be sent to user equipment (UE), a core network device starts a paging timer and sends, to each base station in a paging area, a paging message that carries a UE identifier (ID). When receiving the paging message, the base station in the paging area calculates, according to the UE identifier carried in the paging message, a nearest paging occasion (PO), at an air interface, of the UE corresponding to the UE identifier, and sends, when the PO arrives, the paging message to the UE corresponding to the UE identifier. The UE corresponding to the UE identifier initiates a random access process after receiving the paging message, to establish a connection to the base station and the core network. The downlink data is sent to the UE over the core network after the UE accesses the network. A paging moment depends on a paging super frame (PSF) and the PO.

To save power of the UE in an idle state, an extended discontinuous reception (eDRX) mechanism is introduced into the M2M system. The UE in the idle state listens on a paging channel in an eDRX manner. That is, the UE listens on the paging channel only when a paging moment of each eDRX active period arrives. If no paging message is obtained by listening, the UE enters a sleep state and wakes up when a next paging moment arrives to listen on the paging channel. In this way, power consumption of the UE is reduced. Specifically, the UE maintains a UE-specific eDRX cycle, and the UE reports the eDRX cycle to the core network device by using a NAS message or in another manner. When delivering a paging message, the core network device adds information such as the eDRX cycle and the UE identifier to the paging message, and delivers the paging message to a base station. The base station calculates a paging super frame (PSF) and a PO of the UE according to the information, and sends the paging message at a paging moment that is indicated by the PSF and the PO. The UE calculates the PSF and the PO according to information such as the eDRX cycle of the UE and the UE identifier, and receives the paging message at the paging moment that is indicated by the PSF and the PO. The PSF and the PO that are calculated by the UE need to be the same as the PSF and the PO that are calculated by each base station. The PSF is a super frame that has a PO, and the PO is a frame that is in the paging super frame and that has a paging message.

The inventors find that the existing paging method has the following problems: In consideration of mobility of the UE, if the UE in the idle state moves between different cells, the UE may perform cell reselection before a paging moment of a current cell arrives, a new cell is reselected, and a paging moment of the new cell has passed when reselection is completed. Therefore, the UE misses the paging moment of the current cell, and also misses the paging moment of the new cell. After cell reselection, the UE can receive the paging message only when a paging moment of a next eDRX cycle arrives. In the M2M system, the eDRX cycle is as long as one or more hours. After the new cell is reselected, the UE may need to wait almost one eDRX cycle before the next paging moment arrives. Due to the relatively long time wait, the UE is very likely to perform cell reselection again in this period of time, and also misses an oncoming paging moment of the current cell. After a new cell is reselected, the UE may also miss a paging moment of the new cell, and so on. If the UE keeps moving, cell reselection may occur continually during the wait. Consequently, the UE repeatedly fails to obtain a paging moment, and cannot receive the paging message.

SUMMARY

Embodiments of the present invention provide a paging method, UE, a base station, and a core network device, so as to reduce problems that UE cannot listen for a paging message.

To resolve the foregoing technical problem, the embodiments of the present invention disclose the following technical solutions:

According to a first aspect, an embodiment of the present invention provides a paging method, including:
  determining, by a core network device, reference frame information when the core network device determines that a synchronization occasion arrives, where the reference frame information includes a radio frame number; and
  sending, by the core network device, the reference frame information to a base station in a paging area, so that the base station synchronizes a radio frame in the base station according to the reference frame information.

With reference to the first aspect, in a first possible implementation of the first aspect, that the core network device determines that a synchronization occasion arrives includes:
  determining, by the core network device, that a new base station in the paging area connects to the core network device; or
  determining, by the core network device, that a base station in the paging area restarts and then reconnects to the core network device; or
  determining, by the core network device, that a synchronization moment of each synchronization cycle arrives; or
  receiving, by the core network device, a synchronization request message sent by at least one base station in the paging area.

With reference to the first aspect and/or the first possible implementation of the first aspect, in a second possible implementation of the first aspect, the determining, by a core network device, reference frame information includes:
  pre-storing, by the core network device, an initial radio frame number;
  calculating, by the core network device, an absolute time deviation between a current time and an initial moment, where the initial moment is an initial moment of a radio frame indicated by the radio frame number; and
  determining, by the core network device, the absolute time deviation and the initial radio frame number as the reference frame information.

With reference to the first aspect and/or the first possible implementation of the first aspect, in a third possible implementation of the first aspect, the determining, by a core network device, reference frame information includes:
  pre-storing, by the core network device, an initial radio frame number;
  continually updating, by the core network device, the stored radio frame number to a frame number of a current radio frame of the core network device according to a time length of one radio frame; and
  reading, by the core network device, the radio frame number stored in the core network device.

With reference to the first aspect and/or the first possible implementation of the first aspect, in a fourth possible implementation of the first aspect, the reference frame information further includes a subframe number; and the determining, by a core network device, reference frame information includes:
  pre-storing, by the core network device, an initial radio frame number and subframe number;
  continually updating, by the core network device, the stored radio frame number to a frame number of a current radio frame and updating the stored subframe number to a subframe number of a current subframe in the current radio frame according to time lengths of a system paging frame and a subframe; and
  reading, by the core network device, the radio frame number and the subframe number that are stored in the core network device.

With reference to the first aspect and/or the first possible implementation of the first aspect, in a fifth possible implementation of the first aspect, the determining, by a core network device, reference frame information includes:
  receiving, by the core network device, frame information of a first base station that is sent by the first base station, and determining the frame information of the first base station as the reference frame information, where
  the frame information includes: a radio frame number of the first base station when the first base station sends the frame information; and the first base station is a base station in the paging area.

With reference to the first aspect and/or the first possible implementation of the first aspect, in a sixth possible implementation of the first aspect, the determining, by a core network device, reference frame information includes:
  receiving, by the core network device, frame information of a first base station that is sent by the first base station, and determining the frame information of the first base station as the reference frame information, where
  the frame information includes: a radio frame number and a subframe number of the first base station when the first base station sends the frame information; and the first base station is a base station in the paging area.

With reference to the fifth possible implementation of the first aspect and/or the sixth possible implementation of the first aspect, in a seventh possible implementation of the first aspect, the determining, by a core network device, reference frame information includes:
  sending, by the core network device, a frame information request to the first base station before receiving the frame information of the first base station.

With reference to the first aspect, and/or the first possible implementation of the first aspect, and/or the second possible implementation of the first aspect, and/or the third possible implementation of the first aspect, and/or the fourth possible implementation of the first aspect, and/or the fifth possible implementation of the first aspect, and/or the sixth possible implementation of the first aspect, and/or the seventh possible implementation of the first aspect, in an eighth possible implementation of the first aspect, after the sending, by the core network device, the frame information to a base station, the method further includes:
  receiving, by the core network device, a reception acknowledgment message that is sent by the base station after the base station receives the frame information.

With reference to the first aspect, and/or the first possible implementation of the first aspect, and/or the second possible implementation of the first aspect, and/or the third possible implementation of the first aspect, and/or the fourth possible implementation of the first aspect, and/or the fifth possible implementation of the first aspect, and/or the sixth possible implementation of the first aspect, and/or the seventh possible implementation of the first aspect, and/or the eighth possible implementation of the first aspect, in a ninth possible implementation of the first aspect, the method further includes:
  receiving, by the core network device, an eDRX cycle of UE that is sent by the UE in a connected state, and calculating a PF and a PO of the UE according to the eDRX cycle; and
  when downlink data for the UE arrives and the UE is in an idle state, sending, by the core network device, a paging message to the base station before a paging moment that is indicated by the PF and the PO, so that the base station sends the paging message to the UE.

With reference to the ninth possible implementation of the first aspect, in a tenth possible implementation of the first aspect, a moment at which the core network device sends the paging message to the base station is nearer to the paging moment between a moment at which the PF and the PO are calculated and the paging moment.

With reference to the first aspect, and/or the first possible implementation of the first aspect, and/or the second possible implementation of the first aspect, and/or the third possible implementation of the first aspect, and/or the fourth possible implementation of the first aspect, and/or the fifth possible implementation of the first aspect, and/or the sixth possible implementation of the first aspect, and/or the seventh possible implementation of the first aspect, and/or the eighth possible implementation of the first aspect, in an eleventh possible implementation of the first aspect, the method further includes:
  receiving, by the core network device, an eDRX cycle of UE that is sent by the UE in a connected state;
  when downlink data for the UE arrives and the UE is in an idle state, sending, by the core network device, a paging message to the base station, where the paging message includes the eDRX cycle of the UE;
  receiving, by the core network device, a first time interval sent by the base station, where the first time interval is sent by the base station when the base station calculates a PF and a PO of the UE according to the eDRX cycle and determines that a time interval between a current time and a paging moment that is indicated by the PF and the PO of the UE is greater than a preset time threshold; and the first time interval is less than or equal to the time interval between the paging moment of the UE and the current time; and sending, by the core network device, a paging message to the base station according to the received first time interval.

With reference to the eleventh possible implementation of the first aspect, in a twelfth possible implementation of the first aspect, the sending, by the core network device, a paging message to the base station according to the received first time interval includes:

for each base station, sending, by the core network device according to a first time interval sent by the base station, a paging message to the base station after the first time interval of the base station; or selecting, by the core network device, a minimum first time interval from first time intervals sent by base stations, and sending a paging message to the base stations after the minimum first time interval.

With reference to the eleventh possible implementation of the first aspect, in a thirteenth possible implementation of the first aspect, the sending, by the core network device, a paging message to the base station includes:

immediately sending, by the core network device, the paging message to the base station when determining that no paging message for the UE has been sent after the UE switches from the connected state to the idle state; or when determining that a paging message for the UE has been sent after the UE switches from the connected state to the idle state, determining, by the core network device according to a time at which a latest paging message for the UE is sent and the eDRX cycle of the UE, a time for sending a current paging message, and sending the paging message to the base station when the time for sending the current paging message arrives.

With reference to the eleventh possible implementation of the first aspect, in a fourteenth possible implementation of the first aspect, the sending, by the core network device, a paging message to the base station includes:

immediately sending, by the core network device, the paging message to the base station when determining that no paging message for the UE has been sent after the UE switches from the connected state to the idle state; or when determining that a paging message for the UE has been sent after the UE switches from the connected state to the idle state, determining, by the core network device according to a pre-stored reference sending time and reference time interval and the eDRX cycle of the UE, a time for sending a current paging message, and sending, by the core network device, the paging message to the base station when the time for sending the current paging message arrives.

With reference to the fourteenth possible implementation of the first aspect, in a fifteenth possible implementation of the first aspect, the method further includes:

each time the core network device sends the paging message, if the first time interval sent by the base station is received, updating, by the core network device, the reference sending time by using a time at which the paging message is sent, and updating the reference time interval by using the received first time interval.

With reference to the first aspect, and/or the first possible implementation of the first aspect, and/or the second possible implementation of the first aspect, and/or the third possible implementation of the first aspect, and/or the fourth possible implementation of the first aspect, and/or the fifth possible implementation of the first aspect, and/or the sixth possible implementation of the first aspect, and/or the seventh possible implementation of the first aspect, and/or the eighth possible implementation of the first aspect, in a sixteenth possible implementation of the first aspect, the method further includes:

receiving, by the core network device, an eDRX cycle of UE that is sent by the UE in a connected state; and immediately sending, by the core network device, the paging message to the base station when downlink data for the UE arrives and the UE is in an idle state, and when the core network device determines that no paging message for the UE has been sent after the UE switches from the connected state to the idle state; or when downlink data for the UE arrives and the UE is in an idle state, and when the core network device determines that a paging message for the UE has been sent after the UE switches from the connected state to the idle state, determining, by the core network device according to a time at which a latest paging message for the UE is sent, the eDRX cycle of the UE, and second time intervals corresponding to the latest paging message sent for the UE, a time for sending a current paging message, and sending the paging message to the base station when the time for sending the current paging message arrives, where the second time intervals corresponding to the latest paging message sent for the UE are: second time intervals carried in paging response messages that are correspondingly fed back by base stations when the core network device sends the latest paging message for the UE; and the second time intervals are used to indicate, to the core network device, paging moments of the UE that are calculated by the base stations.

With reference to the sixteenth possible implementation of the first aspect, in a seventeenth possible implementation of the first aspect, the determining, by the core network device according to a time at which a latest paging message for the UE is sent, the eDRX cycle of the UE, and second time intervals corresponding to the latest paging message sent for the UE, a time for sending a current paging message includes:

selecting, by the core network device, a second time interval that has a minimum value from the second time intervals; and determining, by the core network device according to the following formula, the time for sending the current paging message:

Time for sending the current paging message=Time at which the latest paging message for the UE is sent+$M$*eDRX cycle+Second time interval that has the minimum value, where M is a natural number.

According to a second aspect, an embodiment of the present invention provides a paging method, including:

receiving, by a base station, reference frame information sent by a core network device, where the reference frame information includes a radio frame number; and synchronizing, by the base station, a radio frame in the base station according to the reference frame information.

With reference to the second aspect, in a first possible implementation of the second aspect, the synchronizing, by the base station, a radio frame in the base station according to the frame information includes:
  calculating, by the base station according to an absolute time deviation and a length of one radio frame, a quantity of radio frames included in the absolute time deviation and a remaining time deviation;
  calculating, by the base station according to the remaining time deviation and a length of one subframe, a quantity of subframes included in the remaining time deviation; and
  adding, by the base station, an initial radio frame number and the quantity of radio frames to obtain a frame number of a current radio frame, and determining a subframe number of a current subframe in the current radio frame according to the quantity of subframes.

With reference to the second aspect, in a second possible implementation of the second aspect, the synchronizing, by the base station, a radio frame in the base station according to the frame information includes:
  updating, by the base station, a frame number of a current radio frame in the base station to the radio frame number carried in the reference frame information.

With reference to the second aspect, in a third possible implementation of the second aspect, the frame information further includes a subframe number; and the synchronizing, by the base station, a radio frame in the base station according to the frame information includes:
  updating, by the base station, a frame number of a current radio frame in the base station to the radio frame number carried in the reference frame information, and updating a subframe number of the current radio frame in the base station to the subframe number carried in the reference frame information.

With reference to the second aspect, and/or the first possible implementation of the second aspect, and/or the second possible implementation of the second aspect, and/or the third possible implementation of the second aspect, in a fourth possible implementation of the second aspect, the method further includes:
  sending, by the base station, a reception acknowledgment message for the reference frame information to the core network device.

With reference to the second aspect, and/or the first possible implementation of the second aspect, and/or the second possible implementation of the second aspect, and/or the third possible implementation of the second aspect, in a fifth possible implementation of the second aspect, the method further includes:
  receiving, by the base station, a paging message sent by the core network device;
  calculating, by the base station, a PF and a PO of UE according to an eDRX cycle and a UE identifier that are carried in the paging message; and
  sending, by the base station, the paging message for the UE at a paging moment that is indicated by the PF and the PO of the UE.

With reference to the second aspect, and/or the first possible implementation of the second aspect, and/or the second possible implementation of the second aspect, and/or the third possible implementation of the second aspect, in a sixth possible implementation of the second aspect, the method further includes:
  receiving, by the base station, a paging message sent by the core network device;
  calculating, by the base station, a PF and a PO of UE according to an eDRX cycle and a UE identifier that are carried in the paging message;
  determining, by the base station, a first time interval when determining that a time interval between a current time and a paging moment that is indicated by the PF and the PO is greater than a preset time threshold, and sending the determined first time interval to the core network device, where the first time interval is less than or equal to the time interval between the paging moment and the current time; and
  receiving, by the base station, a paging message for the UE that is sent by the core network device according to the first time interval.

With reference to the sixth possible implementation of the second aspect, in a seventh possible implementation of the second aspect, before the sending the determined first time interval to the core network device, the method further includes:
  obtaining, by the base station, a recommended cell list in the received paging message, and determining that the base station is a base station serving a cell listed in the recommended cell list; or
  obtaining, by the base station, a recommended base station list in the received paging message, and determining that the base station is a base station listed in the recommended cell list.

With reference to the second aspect, and/or the first possible implementation of the second aspect, and/or the second possible implementation of the second aspect, and/or the third possible implementation of the second aspect, in an eighth possible implementation of the second aspect, the method further includes:
  receiving, by the base station, a paging message sent by the core network device;
  calculating, by the base station, a PF and a PO of UE according to an eDRX cycle and a UE identifier that are carried in the paging message; and
  determining, by the base station, a second time interval according to a time interval between a current time and a paging moment that is indicated by the PF and the PO, adding the second time interval to a paging response message, and sending the paging response message to the core network device, where the second time interval is used to indicate, to the core network device, the paging moment that is indicated by the PF and the PO.

With reference to the second aspect, and/or the first possible implementation of the second aspect, and/or the second possible implementation of the second aspect, and/or the third possible implementation of the second aspect, and/or the fourth possible implementation of the second aspect, and/or the fifth possible implementation of the second aspect, and/or the sixth possible implementation of the second aspect, and/or the seventh possible implementation of the second aspect, and/or the eighth possible implementation of the second aspect, in a ninth possible implementation of the second aspect, before the receiving, by a base station, frame information sent by a core network device, the method further includes:
  sending, by the base station, a synchronization request message to the core network device when determining that a time between a current moment and a moment at which latest reference frame information is received exceeds a preset cycle value, where the synchronization request message is used to request the core network device to send current frame information.

According to a third aspect, a paging method is provided, including:

calculating, by user equipment, a PF and a PO of the user equipment when entering an idle state;

waking up, by the user equipment, at a first moment before a paging moment that is indicated by the PF and the PO, and determining whether the user equipment performs cell reselection, where a time interval between the first moment and the paging moment is greater than or equal to a time that is used by the user equipment to complete one cell reselection; and if cell reselection is to be performed, listening for a paging message on a paging channel of a reselected cell after cell reselection is completed; or if cell reselection is not to be performed, listening for a paging message on a paging channel of a current cell, or entering a sleep state and waking up at the paging moment to listen for a paging message on a paging channel of a current cell.

With reference to the third aspect, in a first possible implementation of the third aspect, the time interval between the first moment and the paging moment is greater than or equal to a sum of a time length of one radio frame and the time that is used by the user equipment to complete one cell reselection.

According to a fourth aspect, an embodiment of the present invention provides a core network device, including:

a processor, configured to determine, by the core network device, reference frame information when determining that a synchronization occasion arrives, where the reference frame information includes a radio frame number; and a transmitter, configured to send the reference frame information determined by the processor to a base station in a paging area, so that the base station synchronizes a radio frame in the base station according to the reference frame information.

With reference to the fourth aspect, in a first possible implementation of the fourth aspect, the processor is specifically configured to:

determine that a new base station in the paging area connects to the core network device; or determine that a base station in the paging area restarts and then reconnects to the core network device; or determine that a synchronization moment of each synchronization cycle arrives; or receive a synchronization request message sent by at least one base station in the paging area.

With reference to the fourth aspect and/or the first possible implementation of the fourth aspect, in a second possible implementation of the fourth aspect, the processor is specifically configured to:

pre-store an initial radio frame number;

calculate an absolute time deviation between a current time and an initial moment, where the initial moment is an initial moment of a radio frame indicated by the radio frame number; and determine the absolute time deviation and the initial radio frame number as the reference frame information.

With reference to the fourth aspect and/or the first possible implementation of the fourth aspect, in a third possible implementation of the fourth aspect, the processor is specifically configured to:

pre-store an initial radio frame number;

continually update the stored radio frame number to a frame number of a current radio frame of the core network device according to a time length of one radio frame; and read the radio frame number stored in the core network device.

With reference to the fourth aspect and/or the first possible implementation of the fourth aspect, in a fourth possible implementation of the fourth aspect, the frame information further includes a subframe number; and the processor is specifically configured to:

pre-store an initial radio frame number and subframe number;

continually update the stored radio frame number to a frame number of a current radio frame and update the stored subframe number to a subframe number of a current subframe in the current radio frame according to time lengths of a system paging frame and a subframe; and read the radio frame number and the subframe number that are stored in the core network device.

With reference to the fourth aspect and/or the first possible implementation of the fourth aspect, in a fifth possible implementation of the fourth aspect, the core network device further includes:

a receiver, configured to receive frame information of a first base station that is sent by the first base station, where the frame information includes: a radio frame number of the first base station when the first base station sends the frame information; and the first base station is a base station in the paging area, where the processor is further configured to determine the frame information of the first base station as the reference frame information.

With reference to the fourth aspect and/or the first possible implementation of the fourth aspect, in a sixth possible implementation of the fourth aspect, the core network device further includes:

a receiver, configured to receive frame information of a first base station that is sent by the first base station, where the frame information includes: a radio frame number and a subframe number of the first base station when the first base station sends the frame information; and the first base station is a base station in the paging area, where the processor is further configured to determine the frame information of the first base station as the reference frame information.

With reference to the fifth possible implementation of the fourth aspect and/or the sixth possible implementation of the fourth aspect, in a seventh possible implementation of the fourth aspect, the transmitter is further configured to send a frame information request to the first base station before the receiver receives the frame information of the first base station.

With reference to the fourth aspect, and/or the first possible implementation of the fourth aspect, and/or the second possible implementation of the fourth aspect, and/or the third possible implementation of the fourth aspect, and/or the fourth possible implementation of the fourth aspect, and/or the fifth possible implementation of the fourth aspect, and/or the sixth possible implementation of the fourth aspect, and/or the seventh possible implementation of the fourth aspect, in an eighth possible implementation of the fourth aspect, the core network device further includes:

the receiver is configured to receive a reception acknowledgment message that is sent by the base station after the base station receives the frame information.

With reference to the fourth aspect, and/or the first possible implementation of the fourth aspect, and/or the second possible implementation of the fourth aspect, and/or the third possible implementation of the fourth aspect, and/or the fourth possible implementation of the fourth aspect, and/or the fifth possible implementation of the fourth aspect, and/or the sixth possible implementation of the fourth aspect, and/or the seventh possible implementation of the fourth aspect, and/or the eighth possible implementation of the fourth aspect, in a ninth possible implementation of the fourth aspect, the core network device further includes:
- the receiver is configured to receive an eDRX cycle of UE that is sent by the UE in a connected state;
- the processor is further configured to calculate a PF and a PO of the UE according to the eDRX cycle; and
- the transmitter is further configured to: when downlink data for the UE arrives and the UE is in an idle state, send a paging message to the base station before a paging moment that is indicated by the PF and the PO, so that the base station sends the paging message to the UE.

With reference to the ninth possible implementation of the fourth aspect, in a tenth possible implementation of the fourth aspect, a moment at which the core network device sends the paging message to the base station is nearer to the paging moment between a moment at which the PF and the PO are calculated and the paging moment.

With reference to the fourth aspect, and/or the first possible implementation of the fourth aspect, and/or the second possible implementation of the fourth aspect, and/or the third possible implementation of the fourth aspect, and/or the fourth possible implementation of the fourth aspect, and/or the fifth possible implementation of the fourth aspect, and/or the sixth possible implementation of the fourth aspect, and/or the seventh possible implementation of the fourth aspect, and/or the eighth possible implementation of the fourth aspect, in an eleventh possible implementation of the fourth aspect, the core network device further includes:
- the receiver is configured to receive an eDRX cycle of UE that is sent by the UE in a connected state;
- the transmitter is configured to: when downlink data for the UE arrives and the UE is in an idle state, send a paging message to the base station, where the paging message includes the eDRX cycle of the UE;
- the receiver is further configured to receive a first time interval sent by the base station, where the first time interval is sent by the base station when the base station calculates a PF and a PO of the UE according to the eDRX cycle and determines that a time interval between a current time and a paging moment that is indicated by the PF and the PO of the UE is greater than a preset time threshold; and the first time interval is less than or equal to the time interval between the paging moment of the UE and the current time; and
- the transmitter is further configured to send a paging message to the base station according to the received first time interval.

With reference to the eleventh possible implementation of the fourth aspect, in a twelfth possible implementation of the fourth aspect, the transmitter is specifically configured to:
for each base station, send, according to a first time interval sent by the base station, a paging message to the base station after the first time interval of the base station; or
select a minimum first time interval from first time intervals sent by base stations, and send a paging message to the base stations after the minimum first time interval.

With reference to the eleventh possible implementation of the fourth aspect, in a thirteenth possible implementation of the fourth aspect, the transmitter is specifically configured to:
- immediately send the paging message to the base station when it is determined that no paging message for the UE has been sent after the UE switches from the connected state to the idle state; or
- when it is determined that a paging message for the UE has been sent after the UE switches from the connected state to the idle state, determine, according to a time at which a latest paging message for the UE is sent and the eDRX cycle of the UE, a time for sending a current paging message, and send the paging message to the base station when the time for sending the current paging message arrives.

With reference to the eleventh possible implementation of the fourth aspect, in a fourteenth possible implementation of the fourth aspect, the transmitter is specifically configured to:
- immediately send the paging message to the base station when it is determined that no paging message for the UE has been sent after the UE switches from the connected state to the idle state; or
- when it is determined that a paging message for the UE has been sent after the UE switches from the connected state to the idle state, determine, according to a pre-stored reference sending time and reference time interval and the eDRX cycle of the UE, a time for sending a current paging message, and send, by the core network device, the paging message to the base station when the time for sending the current paging message arrives.

With reference to the fourteenth possible implementation of the fourth aspect, in a fifteenth possible implementation of the fourth aspect, the processor is further configured to:
each time the paging message is sent, if the first time interval sent by the base station is received, update the reference sending time by using a time at which the paging message is sent, and update the reference time interval by using the received first time interval.

With reference to the fourth aspect, and/or the first possible implementation of the fourth aspect, and/or the second possible implementation of the fourth aspect, and/or the third possible implementation of the fourth aspect, and/or the fourth possible implementation of the fourth aspect, and/or the fifth possible implementation of the fourth aspect, and/or the sixth possible implementation of the fourth aspect, and/or the seventh possible implementation of the fourth aspect, and/or the eighth possible implementation of the fourth aspect, in a sixteenth possible implementation of the fourth aspect, the core network device further includes:
- the receiver is configured to receive an eDRX cycle of UE that is sent by the UE in a connected state;
- the processor is further configured to: when downlink data for the UE arrives and the UE is in an idle state, and when it is determined that a paging message for the UE has been sent after the UE switches from the connected state to the idle state, determine, according to a time at which a latest paging message for the UE is sent, the eDRX cycle of the UE, and second time intervals corresponding to the latest paging message sent for the UE, a time for sending a current paging message; and the transmitter is further configured to: immediately send the paging message to the base station when the downlink data for the UE arrives and the UE is in the idle state, and when it is determined that no paging message for the UE has been sent after the UE switches from the connected state to the idle state; or when the downlink data for the UE arrives and the UE is in the idle state, and when it is determined that the paging message for the UE has been sent after the UE switches from the connected state to the idle state, send the paging message to the base station when the time for sending the current paging message arrives, where the second time intervals corresponding to the latest paging message sent for the UE are: second time intervals carried in paging response messages that are correspondingly fed back by base stations when the core network device sends the latest paging message for the UE; and the second time intervals are used to indicate, to the core network device, paging moments of the UE that are calculated by the base stations.

With reference to the sixteenth possible implementation of the fourth aspect, in a seventeenth possible implementation of the fourth aspect, the processor is specifically configured to select a second time interval that has a minimum value from the second time intervals; and determine, according to the following formula, the time for sending the current paging message:

Time for sending the current paging message=Time at which the latest paging message for the UE is sent+$M$*eDRX cycle+Second time interval that has the minimum value, where M is a natural number.

According to a fifth aspect, an embodiment of the present invention provides a base station, including:

a receiver, configured to receive reference frame information sent by a core network device, where the reference frame information includes a radio frame number; and a processor, configured to synchronize a radio frame in the base station according to the reference frame information received by the receiver.

With reference to the fifth aspect, in a first possible implementation of the fifth aspect, the processor is specifically configured to:

calculate, according to an absolute time deviation and a length of one radio frame, a quantity of radio frames included in the absolute time deviation and a remaining time deviation;

calculate, according to the remaining time deviation and a length of one subframe, a quantity of subframes included in the remaining time deviation; and add an initial radio frame number and the quantity of radio frames to obtain a frame number of a current radio frame, and determine a subframe number of a current subframe in the current radio frame according to the quantity of subframes.

With reference to the fifth aspect, in a second possible implementation of the fifth aspect, the processor is specifically configured to:

update a frame number of a current radio frame in the base station to the radio frame number carried in the reference frame information.

With reference to the fifth aspect, in a third possible implementation of the fifth aspect, the frame information further includes a subframe number; and the processor is specifically configured to:

update a frame number of a current radio frame in the base station to the radio frame number carried in the reference frame information, and update a subframe number of the current radio frame in the base station to the subframe number carried in the reference frame information.

With reference to the fifth aspect, and/or the first possible implementation of the fifth aspect, and/or the second possible implementation of the fifth aspect, and/or the third possible implementation of the fifth aspect, in a fourth possible implementation of the fifth aspect, the base station further includes:

a transmitter, configured to send a reception acknowledgment message for the reference frame information to the core network device.

With reference to the fifth aspect, and/or the first possible implementation of the fifth aspect, and/or the second possible implementation of the fifth aspect, and/or the third possible implementation of the fifth aspect, in a fifth possible implementation of the fifth aspect, the base station further includes:

the receiver is further configured to receive a paging message sent by the core network device;

the processor is further configured to calculate a PF and a PO of UE according to an eDRX cycle and a UE identifier that are carried in the paging message; and the transmitter is further configured to send the paging message for the UE at a paging moment that is indicated by the PF and the PO of the UE.

With reference to the fifth aspect, and/or the first possible implementation of the fifth aspect, and/or the second possible implementation of the fifth aspect, and/or the third possible implementation of the fifth aspect, in a sixth possible implementation of the fifth aspect, the base station further includes:

the receiver is further configured to receive a paging message sent by the core network device;

the processor is further configured to: calculate a PF and a PO of UE according to an eDRX cycle and a UE identifier that are carried in the paging message; and determine a first time interval when determining that a time interval between a current time and a paging moment that is indicated by the PF and the PO is greater than a preset time threshold;

the transmitter is further configured to send the determined first time interval to the core network device, where the first time interval is less than or equal to the time interval between the paging moment and the current time; and the receiver is further configured to receive a paging message for the UE that is sent by the core network device according to the first time interval.

With reference to the sixth possible implementation of the fifth aspect, in a seventh possible implementation of the fifth aspect, the processor is further configured to:

obtain a recommended cell list in the paging message received by the receiver, and determine that the base station is a base station serving a cell listed in the recommended cell list; or obtain a recommended base station list in the paging message received by the receiver, and determine that the base station is a base station listed in the recommended cell list.

With reference to the fifth aspect, and/or the first possible implementation of the fifth aspect, and/or the second possible implementation of the fifth aspect, and/or the third possible implementation of the fifth aspect, in an eighth possible implementation of the fifth aspect, the base station further includes:

the receiver is further configured to receive a paging message sent by the core network device;

the processor is further configured to: calculate a PF and a PO of UE according to an eDRX cycle and a UE identifier that are carried in the paging message; and determine a second time interval according to a time interval between a current time and a paging moment that is indicated by the PF and the PO; and the base station further includes: a transmitter, configured to add the second time interval to a paging response message, and send the paging response message to the core network device, where the second time interval is used to indicate, to the core network device, the paging moment that is indicated by the PF and the PO.

With reference to the fifth aspect, and/or the first possible implementation of the fifth aspect, and/or the second possible implementation of the fifth aspect, and/or the third possible implementation of the fifth aspect, and/or the fourth possible implementation of the fifth aspect, and/or the fifth possible implementation of the fifth aspect, and/or the sixth possible implementation of the fifth aspect, and/or the seventh possible implementation of the fifth aspect, and/or the eighth possible implementation of the fifth aspect, in a ninth possible implementation of the fifth aspect, the transmitter is further configured to send a synchronization request message to the core network device when the processor determines that a time between a current moment and a moment at which latest reference frame information is received exceeds a preset cycle value, where the synchronization request message is used to request the core network device to send current frame information.

According to a sixth aspect, an embodiment of the present invention provides user equipment, including:

a processor, configured to calculate a PF and a PO of the user equipment when the user equipment enters an idle state; and wake up the user equipment at a first moment before a paging moment that is indicated by the PF and the PO, and determine whether the user equipment performs cell reselection, where a time interval between the first moment and the paging moment is greater than or equal to a time that is used by the user equipment to complete one cell reselection; and if cell reselection is to be performed, complete cell reselection; and a receiver, configured to: when the processor determines that cell reselection is to be performed, listen for a paging message on a paging channel of a reselected cell; or when the processor determines that cell reselection is not to be performed, listen for a paging message on a paging channel of a current cell, or enter a sleep state and wake up at the paging moment to listen for a paging message on a paging channel of a current cell.

With reference to the sixth aspect, in a first possible implementation of the sixth aspect, the time interval between the first moment and the paging moment is greater than or equal to a sum of a time length of one radio frame and the time that is used by the user equipment to complete one cell reselection.

In the embodiments of the present invention, the core network device determines the reference frame information when the core network device determines that the synchronization occasion arrives. The reference frame information includes the radio frame number. The core network device sends the reference frame information to the base station in the paging area, so that the base station synchronizes the radio frame in the base station according to the reference frame information. In this way, at least radio frame numbers are synchronous between the core network device and the base station, and a time difference between the core network device and the base station is limited to the time length of one radio frame, thereby decreasing a time error between cells of different base stations as much as possible, and reducing, to some extent, problems that the UE still misses a paging moment of a new cell even though cell reselection is completed before a paging moment of a current cell.

BRIEF DESCRIPTION OF DRAWINGS

To describe the technical solutions in the embodiments of the present invention more clearly, the following briefly describes the accompanying drawings required for describing the embodiments. Apparently, a person of ordinary skill in the art may still derive other drawings from these accompanying drawings without creative efforts.

DESCRIPTION OF EMBODIMENTS

The inventors find that, a reason why UE misses paging moments of cells before and after reselection when cell reselection happens is that base stations are out of synchronization in time. Although different base stations obtain a same PSF and PO of same UE by calculation, because the base stations are out of synchronization in time, a paging moment indicated by the same PSF and PO may correspond to different absolute time on the different base stations. For example, it is assumed that a PSF 1 and a PO 1 of UE 1 indicate a paging moment 1, the UE 1 is currently located in a cell a of a base station A, and reselects a cell b of a base station B, the paging moment 1 of the UE 1 arrives at absolute time t1 in the cell of the base station A, and the paging moment 1 of the UE 1 arrives at absolute time t2 in the cell of the base station B. If t2<t1, even if the UE starts to perform cell reselection and reselects the cell b before the paging moment 1 of the cell a arrives, and a time at which the UE completes reselection is earlier than t1, the UE misses the paging moment 1 of the cell b provided that the time is later than t2. Consequently, the UE 1 needs to wait a paging moment of the cell b in a next eDRX cycle. Further, if the UE 1 moves frequently and the foregoing case repeats, the UE 1 cannot obtain a paging message for a long time by listening, and cannot receive data that a core network intends to deliver.

Therefore, the embodiments of the present invention provide a paging method, so as to reduce problems that the UE cannot obtain a paging message by listening in the foregoing case.

To make a person skilled in the art understand the technical solutions in the embodiments of the present invention better, and make the objectives, features, and advantages of the embodiments of the present invention clearer, the following further describes the technical solutions in the embodiments of the present invention in detail with reference to the accompanying drawings.

Figures 1, 2:
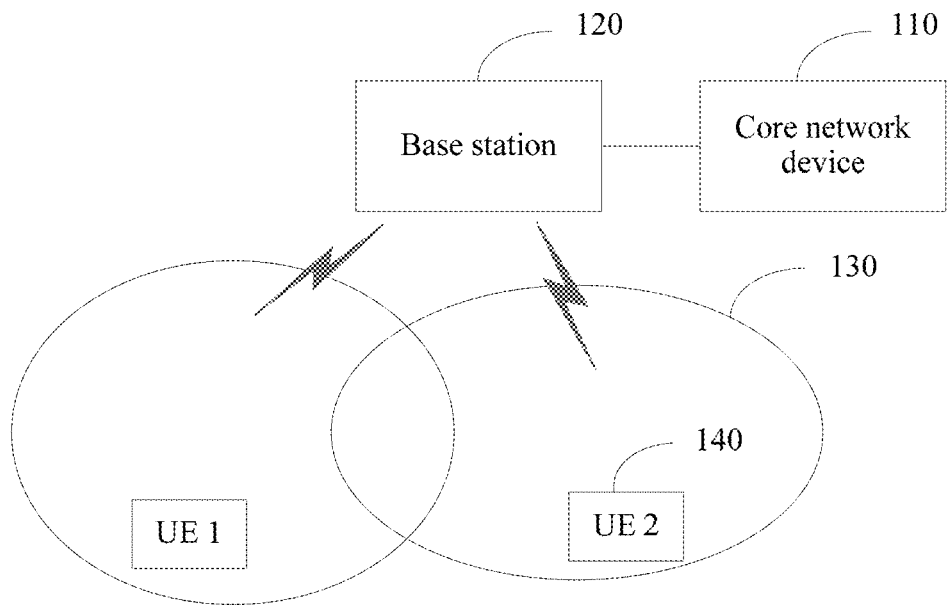
FIG. 1 shows an example of an application scenario according to an embodiment of the present invention.
FIG. 2 is a schematic flowchart of a paging method according to an embodiment of the present invention.

The paging method in the embodiments of the present invention may be applied to a paging scenario that is in M2M, LTE, and other communications systems and that satisfies the following conditions: An eDRX manner is used and UE is mobile to some extent. For example, FIG. 1 shows an example of a network structure to which a paging method according to an embodiment of the present invention is applied. The network structure includes: a core network device 110, base stations 120, cells 130 of the base stations 120, and UE 140. The UE 140 is in one of the cells 130. The UE 140 is mobile to some extent, and may move to another cell.

When this embodiment of the present invention is applied to M2M, in this embodiment of the present invention, the radio frame is a super frame in M2M, the subframe is a frame in the super frame, a core network device may be a serving GPRS support node (SGSN). When this embodiment of the present invention is applied to LTE, in this embodiment of the present invention, the radio frame is a frame in LTE, the subframe is a subframe in LTE, and a core network device may be a mobility management entity (MME). A paging super frame in M2M, a paging frame in LTE, and another radio frame that has a PO are referred to as a paging frame (PF) in this embodiment of the present invention. The PF is a radio frame that has a PO, the PO is a subframe that is in the radio frame and that has a paging message, and one PF may include one or more POs.

Referring to FIG. 2, FIG. 2 is a schematic flowchart of a paging method according to an embodiment of the present invention. The method includes the following steps.

Step 201: A core network device determines reference frame information when the core network device determines that a synchronization occasion arrives, where the reference frame information includes a radio frame number.

That the core network device determines that a synchronization occasion arrives may include:
  determining, by the core network device, that a new base station in a paging area connects to the core network device; or
  determining, by the core network device, that a base station in a paging area restarts and then reconnects to the core network device; or
  determining, by the core network device, that a synchronization moment of each synchronization cycle arrives; or
  receiving, by the core network device, a synchronization request message sent by at least one base station in a paging area.

A specific cycle length of the synchronization cycle is not limited in this embodiment of the present invention, and the synchronization moment in each synchronization cycle is not limited in this embodiment of the present invention, provided that the core network device sends the reference frame information.

In this step, the determining, by a core network device, reference frame information may include:
  pre-storing, by the core network device, an initial radio frame number;
  calculating, by the core network device, an absolute time deviation between a current time and an initial moment, where the initial moment is an initial moment of a radio frame indicated by the radio frame number; and
  determining, by the core network device, the absolute time deviation and the initial radio frame number as the reference frame information.

In this step, the determining, by a core network device, reference frame information may include: pre-storing, by the core network device, an initial radio frame number; continually updating, by the core network device, the stored radio frame number to a frame number of a current radio frame of the core network device according to a time length of one radio frame; and reading, by the core network device, the radio frame number stored in the core network device.

For example, it is assumed that the initial radio frame number pre-stored in the core network device is 0, the initial moment is 0, and the time length of one radio frame is T. At a time T, the frame number of the current radio frame is 1, and the frame number 1 is used to update the stored radio frame number 0. At a time 2T, the frame number of the current radio frame is 2, and the frame number 2 is used to update the stored radio frame number 1, and so on. Therefore, the stored radio frame number is updated in real time, and it is ensured that the stored radio frame number is always the frame number of the current radio frame.

The reference frame information may further include a subframe number. In this case, the determining, by a core network device, reference frame information may include: pre-storing, by the core network device, an initial radio frame number and subframe number; continually updating, by the core network device, the stored radio frame number to a frame number of a current radio frame and updating the stored subframe number to a subframe number of a current subframe in the current radio frame according to time lengths of a system paging frame and a subframe; and reading, by the core network device, the radio frame number and the subframe number that are stored in the core network device.

For example, it is assumed that the initial radio frame number pre-stored in the core network device is 0, the subframe number pre-stored in the core network device is 0, the initial moment is 0, the time length of one radio frame is T, and each radio frame has 64 subframes. At a time T/64, the frame number of the current radio frame is 0, the subframe number is 1, and the frame number 0 and the subframe number 1 are used to update the stored radio frame number 0 and subframe number 0. At a time T/32, the frame number of the current radio frame is 0, the subframe number is 2, and the frame number 0 and the subframe number 2 are used to update the stored radio frame number 0 and subframe number 1, and so on. Therefore, the stored radio frame number and subframe number are updated in real time, and it is ensured that the stored radio frame number and subframe number are always the frame number of the current radio frame and the subframe number of the current subframe in the current radio frame.

In the foregoing description, the core network device maintains current frame information of the core network device, and uses the maintained frame information as the reference frame information. Alternatively, the core network device may not maintain current frame information, but obtain, from a base station in the paging area, current frame information of the base station and use the current frame information of the base station as the reference frame information.

For example, the determining, by a core network device, reference frame information may include:

receiving, by the core network device, frame information of a first base station that is sent by the first base station, and determining the frame information of the first base station as the reference frame information, where the frame information includes: a radio frame number of the first base station when the first base station sends the frame information; and the first base station is a base station in the paging area.

Alternatively, the determining, by a core network device, reference frame information may include:

receiving, by the core network device, frame information of a first base station that is sent by the first base station, and determining the frame information of the first base station as the reference frame information, where the frame information includes: a radio frame number and a subframe number of the first base station when the first base station sends the frame information; and the first base station is a base station in the paging area.

In the foregoing two examples, the first base station may actively send the frame information of the first base station to the core network device. During actual application, the first base station may alternatively send the frame information of the first base station to the core network device when the core network device sends a request. In this case, the determining, by a core network device, reference frame information may include:

sending, by the core network device, a frame information request to the first base station; and receiving, by the core network device, frame information of the first base station that is sent by the first base station, and determining the frame information of the first base station as the reference frame information, where the frame information includes: a radio frame number of the first base station when the first base station sends the frame information; and the first base station is a base station in the paging area.

Alternatively, the determining, by a core network device, reference frame information may include:

sending, by the core network device, a frame information request to the first base station; and receiving, by the core network device, frame information of the first base station that is sent by the first base station, and determining the frame information of the first base station as the reference frame information, where the frame information includes: a radio frame number and a subframe number of the first base station when the first base station sends the frame information; and the first base station is a base station in the paging area.

Step 202: The core network device sends the reference frame information to a base station in a paging area, so that the base station synchronizes a radio frame in the base station according to the reference frame information.

In this step, the core network device may send the reference frame information to all base stations in the paging area, or may send the reference frame information to one or more base stations in the paging area. Specifically, this may be independently set during actual application, and is not limited herein. For example, when the synchronization occasion of the core network device is that a new base station connects to the core network device, the core network device may send the reference frame information only to the new base station, or may send the reference frame information to all the base stations in the paging area. Alternatively, when the synchronization occasion of the core network device is that a synchronization request message of a base station is received, in this step, the core network device may send the reference frame information only to the base station that sends the synchronization request message, or may send the reference frame information to all the base stations in the paging area.

In this embodiment, the core network device sends current reference frame information of the core network device to the base station, so that the base station updates the radio frame in the base station according to the reference frame information. The reference frame information includes the radio frame number. In this way, at least radio frame numbers are synchronous between the core network device and the base station, and a time difference between the core network device and the base station is limited to the time length of one radio frame, thereby decreasing a time error between cells of different base stations as much as possible, and reducing, to some extent, problems that the UE still misses a paging moment of a new cell even though cell reselection is completed before a paging moment of a current cell.

Figure 3:
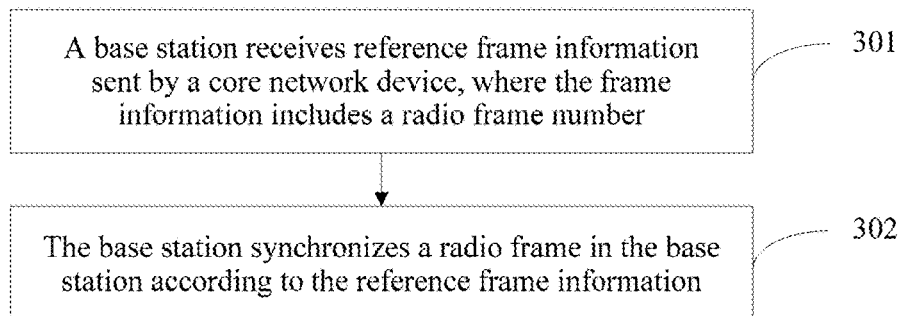
FIG. 3 is another schematic flowchart of a paging method according to an embodiment of the present invention.

Referring to FIG. 3, FIG. 3 is another schematic flowchart of a paging method according to an embodiment of the present invention. The method includes the following steps:

Step 301: A base station receives reference frame information sent by a core network device, where the frame information includes a radio frame number.

Step 302: The base station synchronizes a radio frame in the base station according to the reference frame information.

The synchronizing, by the base station, a radio frame in the base station according to the reference frame information may include:

updating, by the base station, a frame number of a current radio frame in the base station to the radio frame number carried in the reference frame information.

The frame information may further include a subframe number. Correspondingly, the synchronizing, by the base station, a radio frame in the base station according to the reference frame information may include:

updating, by the base station, a frame number of a current radio frame in the base station to the radio frame number carried in the reference frame information, and updating a subframe number of the current radio frame in the base station to the subframe number carried in the reference frame information.

The frame information may further include an absolute time deviation between a current time and an initial moment. Correspondingly, the synchronizing, by the base station, a radio frame in the base station according to the reference frame information may include:

determining, by the base station, a frame number of a current radio frame and a subframe number of a current subframe in the current radio frame according to the absolute time deviation and an initial radio frame number.

Specifically, the base station may calculate, according to the absolute time deviation and a length of one radio frame, a quantity of radio frames included in the absolute time deviation and a remaining time deviation, and calculate, according to the remaining time deviation and a length of one subframe, a quantity of subframes included in the remaining time deviation; and add the initial radio frame number and the quantity of radio frames to obtain the frame number of the current radio frame; and determine the subframe number of the current subframe in the current radio frame according to the quantity of subframes.

For example, the initial radio frame number is 1, Absolute time deviation/Length of one radio frame=5, a remainder is x, and x/Length of one subframe=3. The frame number of the current radio frame is 1+5=6, and if a subframe number of a subframe starts from 0, the subframe number of the current subframe is 2. If x cannot be exactly divided by the length of one subframe, an obtained quantity of subframes may be rounded up, rounded down, or rounded off to obtain the quantity of subframes. For example, x/Length of one subframe=3.4, the subframe number may be rounded up to 4, or rounded down to 3, or rounded off to 3.

Alternatively, the base station may divide the absolute time deviation by the length of one radio frame and round up a quotient to obtain the quantity of radio frames, and add the initial radio frame number and the quantity of radio frames to obtain the frame number of the current radio frame; and determine that the subframe number of the current subframe in the current radio frame is 0.

For example, Absolute time deviation/Length of one radio frame=5.x, and 5.x is rounded up to obtain that the quantity of radio frames is 6. Assuming that the initial radio frame number is 0, the frame number of the current radio frame is 6, and the subframe number is 0.

In this embodiment, the base station receives the reference frame information sent by the core network device. The reference frame information includes the radio frame number. The base station synchronizes the radio frame in the base station according to the reference frame information. In this way, at least radio frame numbers are synchronous between the core network device and the base station, and a time difference between the core network device and the base station is limited to the time length of one radio frame, thereby decreasing a time error between cells of different base stations as much as possible, and reducing, to some extent, problems that the UE still misses a paging moment of a new cell even though cell reselection is completed before a paging moment of a current cell.

Figure 4:
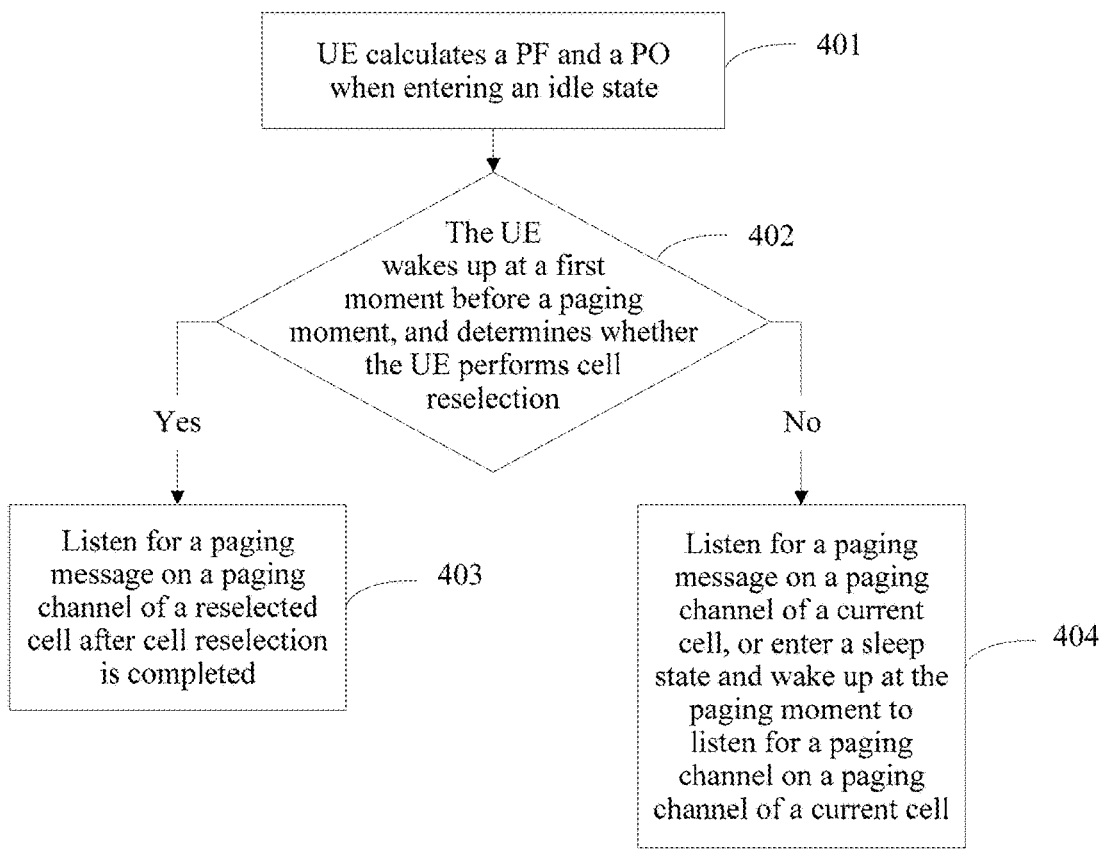
FIG. 4 is another schematic flowchart of a paging method according to an embodiment of the present invention.

FIG. 4 is another schematic flowchart of a paging method according to an embodiment of the present invention. The method includes the following steps.

Step 401: UE calculates a paging frame (PF, Paging Frame) and a PO of the UE when entering an idle state.

Step 402: The UE wakes up at a first moment before a paging moment that is indicated by the PF and the PO, and determines whether the UE performs cell reselection, where a time interval between the first moment and the paging moment is greater than or equal to a time that is used by the UE to complete one cell reselection.

The time for cell reselection usually depends on a time for measuring a neighboring cell in a cell reselection process.

Step 403: If cell reselection is to be performed, listen for a paging message on a paging channel of a reselected cell after cell reselection is completed.

Step 404: If cell reselection is not to be performed, listen for a paging message on a paging channel of a current cell, or enter a sleep state and wake up at the paging moment to listen for a paging message on a paging channel of a current cell.

In this embodiment, the UE calculates the PF and the PO when entering the idle state, wakes up at the first moment before the paging moment that is indicated by the PF and the PO, and determines whether the UE performs cell reselection. The time interval between the first moment and the paging moment is greater than or equal to the time that is used by the UE to complete one cell reselection. If cell reselection is to be performed, the UE listens for the paging message on the paging channel of the reselected cell after cell reselection is completed.

If cell reselection is not to be performed, the UE listens for the paging message on the paging channel of the current cell, or enters the sleep state and wakes up at the paging moment to listen for the paging channel on the paging channel of the current cell. In this way, it is ensured as far as possible that the UE completes cell reselection before the paging moment of the current cell, in combination with the foregoing synchronization of at least radio frame numbers between the core network device and the base station, thereby reducing, to some extent, problems that the UE still misses a paging moment of a new cell even though cell reselection is completed before the paging moment of the current cell.

Figure 5:
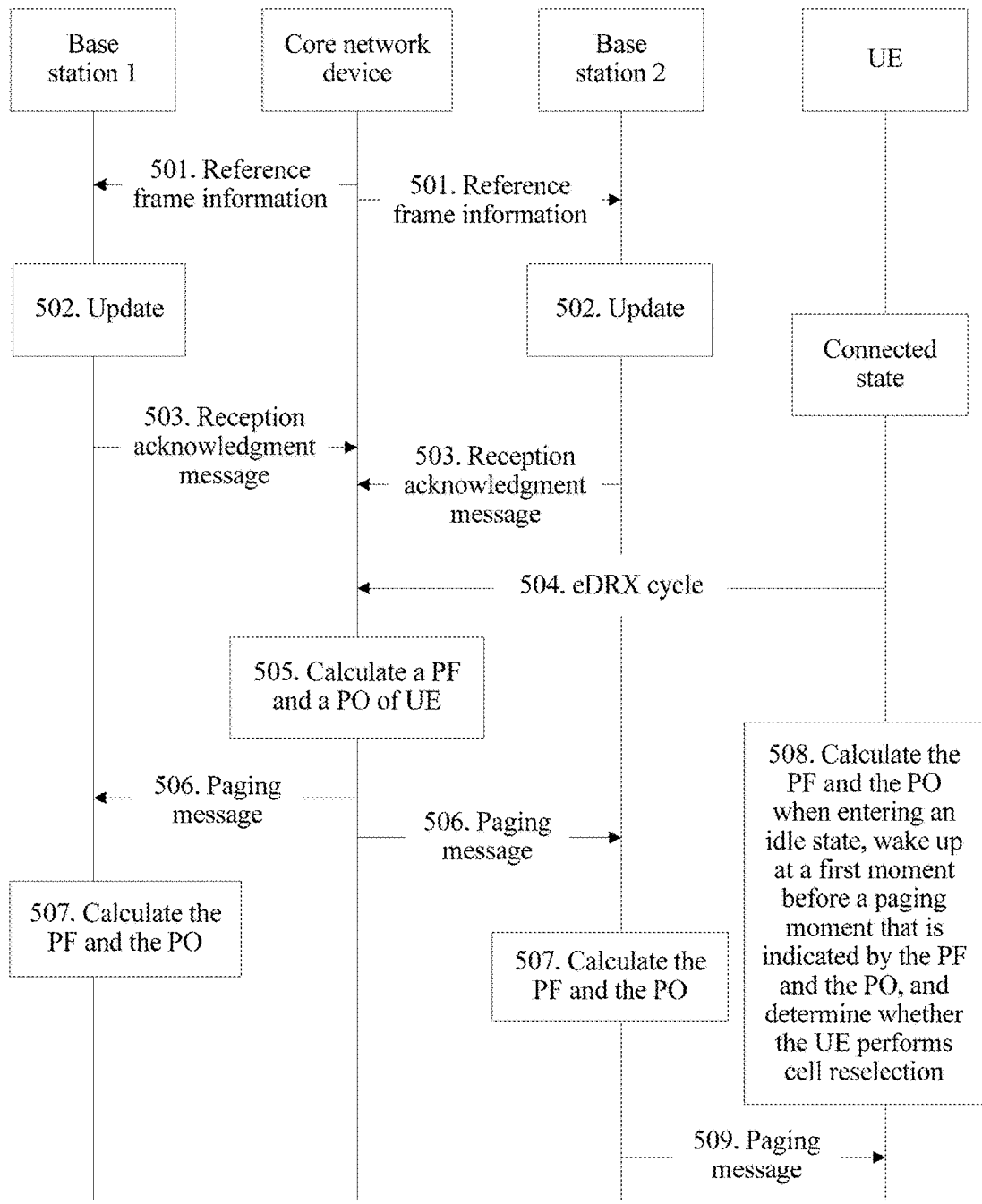
FIG. 5 is another schematic flowchart of a paging method according to an embodiment of the present invention.

FIG. 5 is a schematic flowchart of a paging method according to an embodiment of the present invention. The method includes the following steps.

Step 501: A core network device determines reference frame information when each synchronization occasion arrives, where the reference frame information includes: a radio frame number and a subframe number; and sends the reference frame information to a base station.

The synchronization occasion may include as follows: A new base station in a paging area connects to the core network device; or a base station in the paging area restarts and then reconnects to the core network device; or a synchronization moment of each synchronization cycle arrives; or the core network device receives a synchronization request message sent by at least one base station in the paging area.

The core network device may determine, by setting a synchronization timer, that the synchronization moment of the synchronization cycle arrives. Specifically, a time length of the synchronization timer is equal to a time length of the synchronization cycle. A specific time length of the synchronization cycle is not limited in this embodiment of the present invention. When the synchronization timer expires, the synchronization moment arrives, and step 501 is triggered. The core network device resets the synchronization timer after sending the reference frame information.

The core network device may send the reference frame information by using a newly defined S1 interface message, or may add the reference frame information to a newly added IE in an existing message. If the IE is added to the existing message, the message may be a signaling message or a data message sent by the core network device to the base station. This is not limited in this embodiment of the present invention. In addition, a bit may be reserved in the existing message to indicate whether the message carries the frame information. If the message carries the frame information, the IE is added to a part of the message.

In addition, the message that carries the reference frame information may further indicate whether the base station needs to feed back a reception acknowledgment message to a core network device.

In this case, the synchronization occasion may further include that, in step 501, the core network device receives, within a preset time, no reception acknowledgment message sent by one or more base stations.

The synchronization request message may be a synchronization request message that is sent by the base station to the core network device when the base station determines that a time between a current moment and a moment at which latest frame information is received exceeds a preset cycle value. The synchronization request message is used to request the core network device to send the reference frame information. The current moment herein is a moment at which the base station performs the determining step. The base station may start a synchronization timer each time the frame information is received. A time length of the synchronization timer is the preset cycle value. When the synchronization timer expires and no new frame information is received, the base station determines that the time between the current moment and the moment at which latest frame information is received exceeds the preset cycle value.

For a method for determining the reference frame information by the core network device, refer to a related description in step 201. Details are not described herein again.

Step 502: The base station receives the reference frame information, updates a frame number of a current radio frame in the base station to the radio frame number carried in the reference frame information, and updates a subframe number of the current radio frame in the base station to the subframe number carried in the reference frame information.

Step 503: The base station sends a reception acknowledgment message for the reference frame information to the core network device, and the core network device receives, within a preset time, reception acknowledgment messages sent by base stations.

The reception acknowledgment message may be a newly defined S1 interface message, or an IE that carries the reception acknowledgment message may be added to an existing control message or data message sent by the base station to the core network device.

That the base station sends the reception acknowledgment message may be negotiated and set in advance between the base station and the core network device, or may be indicated by the core network device to the base station by using the message that carries the frame information.

It may be set that if the core network device receives, within the preset time, no reception acknowledgment messages sent by one or more base stations, step 501 is triggered again until a preset maximum quantity of sending times is reached or the reception acknowledgment message sent by the base station is received.

This step is an optional step.

Step 504: UE sends an eDRX cycle of the UE to the core network device in a connected state.

Step 505: The core network device calculates a PF and a PO of the UE according to the eDRX cycle.

The core network device may calculate the PF and the PO of the UE according to the eDRX cycle and a UE identifier.

In step 504, if the eDRX cycle is sent by the UE to the base station and then forwarded by the base station to the core network device, the UE identifier may be added when the base station forwards the eDRX cycle.

In step 504, if the eDRX cycle is sent by the UE and transparently transmitted by the base station to the core network device, the UE identifier may be added when the UE sends the eDRX cycle.

Step 506: When downlink data for the UE arrives and the UE is in an idle state, the core network device sends a paging message to the base station before a paging moment that is indicated by the PF and the PO, where the paging message includes the eDRX cycle of the UE and a UE identifier.

A moment at which the core network device sends the paging message to the base station is preferably nearer to the paging moment between a moment at which the PF and the PO are calculated and the paging moment.

In step 504 to step 506, the core network device calculates the PF and the PO of the UE, stores the paging message, and sends the paging message before the paging moment that is indicated by the PF and the PO. During actual application, a the core network device may not calculate the PF and the PO of the UE. In this case, step 504 to step 506 may be replaced with the following steps.

Step a: The core network device receives an eDRX cycle of UE that is sent by the UE in a connected state.

The core network device may save the eDRX cycle of the UE in the core network device.

Step b: When downlink data for the UE arrives and the UE is in an idle state, the core network device sends a paging message to the base station, where the paging message includes the eDRX cycle of the UE.

The sending, by the core network device, a paging message to the base station may include:
determining, by the core network device, whether a paging message for the UE has been sent after the UE switches from the connected state to the idle state; and
directly sending, by the core network device, the paging message to the base station if the core network device has sent no paging message for the UE after the UE switches from the connected state to the idle state; or
if the core network device has sent a paging message for the UE after the UE switches from the connected state to the idle state, determining, by the core network device according to a time at which a latest paging message is sent and the eDRX cycle of the UE, a time for sending a current paging message, and sending the paging message to the base station when the time for sending the current paging message arrives.

For example, the core network device has sent a paging message 1 for the UE to the base stations after the UE switches from the connected state to the idle state, and a current to-be-sent paging message is a paging message 2. The paging message 1 and the paging message 2 are different paging messages rather than copies of a same paging message.

In this step, the core network device determines that the paging message 1 for the UE has been sent after the UE switches from the connected state to the idle state, and the core network device calculates, according to a time at which a latest paging message 1 is sent and the eDRX cycle of the UE and according to a formula:

$$\text{Time at which the latest paging message 1 is sent} + n*\text{eDRX cycle of the UE, a time nearest to a current time to send the paging message 2.}$$

For example, the core network device has sent no paging message for the UE to the base stations after the UE switches from the connected state to the idle state, and a current to-be-sent paging message is the first paging message sent to the base stations for the UE after the UE switches from the connected state to the idle state. In this step, the core network device determines that no paging message for the UE has been sent after the UE switches from the connected state to the idle state, and the core network device does not further calculate a time for sending the paging message, but directly sends the paging message to the base stations.

Alternatively, the sending, by the core network device, a paging message to the base station may include:

determining, by the core network device, whether a paging message for the UE has been sent after the UE switches from the connected state to the idle state; and directly sending, by the core network device, the paging message to the base station if the core network device has sent no paging message for the UE after the UE switches from the connected state to the idle state; or if the core network device has sent a paging message for the UE after the UE switches from the connected state to the idle state, determining, by the core network device according to a pre-stored reference sending time and reference time interval and the eDRX cycle of the UE, a time for sending a current paging message, and sending, by the core network device, the paging message to the base station when the time for sending the current paging message arrives. A specific calculation formula may be: Time for sending the current paging message=Reference sending time+Reference time interval+m*eDRX, where m is a natural number, and m preferably has such a value that the calculated time for sending the current paging message exceeds the current time and is nearest to the current time.

The reference sending time and the reference time interval that are stored in the core network device are updated continually, and an update rule and method may include:

each time the core network device sends the paging message, if a first time interval sent by the base station when the base station performs step c is received, updating, by the core network device, the reference sending time by using a time at which the paging message is sent, and updating the reference time interval by using the received first time interval.

Further, if the reference time interval is shared by all the base stations, if the core network device receives first time intervals sent by multiple base stations, the core network device may select a first time interval that has a minimum value to update the reference time interval. If each base station corresponds to one reference time interval, the core network device may use a first time interval sent by a corresponding base station to update a reference time interval corresponding to the base station.

Step c: The base station receives the paging message, calculates a PF and a PO of the UE according to the eDRX cycle, and sends a first time interval to the core network device when determining that a time interval between a current time and a paging moment that is indicated by the PF and the PO of the UE is greater than a preset time threshold, where the first time interval is less than or equal to the time interval between the paging moment of the UE and the current time; and step d is to be performed.

If the base station determines that the time interval between the paging moment and the current time is less than the preset time threshold, step 508 is to be performed.

Not all base stations that receive the paging message need to send a first time interval to the core network device, and instead, some base stations send a first time interval. Specifically, whether a base station sends a first time interval may be independently set during actual application, provided that at least one base station sends a first time interval when the time interval between the current time and the paging moment that is indicated by the PF and the PO of the UE is greater than the preset time threshold.

In a possible implementation, the paging message may include a recommended cell list or a recommended base station list. If the paging message includes the recommended cell list, a base station serving a cell listed in the recommended cell list may send a first time interval to the core network device. If the paging message includes the recommended base station list, a base station listed in the recommended base station list may send a first time interval to the core network device.

Step d: The core network device receives the first time interval sent by the base station.

Step e: The core network device sends a paging message to the base station according to the received first time interval.

The sending, by the core network device, a paging message to the base station according to the received first time interval may include:

for each base station, sending, by the core network device according to a first time interval sent by the base station, a paging message to the base station after the first time interval of the base station; or selecting, by the core network device, a minimum first time interval from first time intervals sent by base stations, and sending a paging message to the base stations after the minimum first time interval.

That is, if only one base station sends a first time interval, the core network device may send the paging message to the base station in the paging area after the first time interval of the base station.

If at least two base stations send a first time interval, the core network device may select a minimum first time interval, and send the paging message to the base station in the paging area after the minimum first time interval. Alternatively, the core network device may send the paging message to each base station according to the first time interval of each base station.

Optionally, after the core network device sends the paging message to the base station according to the received first time interval, the method includes: for a subsequent paging message to be sent to the terminal, calculating, by the core network, a subsequent paging frame location of the UE based on the first time interval sent by the base station and the paging eDRX cycle of the terminal.

That is, before the base station reports the time interval, the core network saves the paging message for the terminal. For the subsequent paging message to be sent to the terminal, the core network may calculate the subsequent paging frame location of the terminal based on the time interval that is fed back by the base station and the paging eDRX cycle of the terminal. A specific calculation formula may be:

Paging frame location of the time interval that is fed back by the base station+$N$*Paging eDRX cycle.

When the core network device and the base station perform step a to step e, if at least two base stations send a first time interval in step e, the core network device selects a minimum first time interval, and sends the paging message to the base station in the paging area after the minimum first time interval. Because the core network device selects the minimum first time interval, for a specific base station, a time interval between the paging moment that is indicated by the PF and the PO of the UE and a time at which the base station receives the paging message re-sent by the core network device may be still greater than the preset time threshold. In this case, the base station may re-send a first time interval to the core network device, until the time interval between the paging moment and the time at which the base station receives the paging message sent by the core network device is less than the preset time threshold, or a quantity of times that the base station continually sends a first time interval to the core network device reaches a preset threshold for the quantity of times. Then the base station performs step 507. The core network device may indicate, to each base station by using a paging message, a threshold for a quantity of times for the base station; or a threshold for a quantity of times for a base station may be preset in the base station.

Step 507: The base station receives the paging message, and calculates the PF and the PO of the UE according to the eDRX cycle and the UE identifier that are carried in the paging message.

Step 508: The UE calculates, when entering the idle state, the PF and the PO of the UE according to the eDRX cycle and the UE identifier, wakes up at a first moment before the paging moment that is indicated by the PF and the PO, determines whether the UE performs cell reselection, and if cell reselection is to be performed, listens for a paging message on a paging channel of a reselected cell after cell reselection is completed; or if cell reselection is not to be performed, listens for a paging message on a paging channel of a current cell, or enters a sleep state and wakes up at the paging moment to listen for a paging channel on a paging channel of a current cell.

A time interval between the first moment and the paging moment is greater than or equal to a time that is used by the UE to complete one cell reselection.

If the frame information in step 501 includes only the radio frame number, the time interval between the first moment and the paging moment is preferably greater than or equal to a sum of a time length of one radio frame and the time that is used by the UE to complete one cell reselection.

Step 507 and step 508 are not necessarily performed in a particular order, provided that the two steps are both performed before step 509.

Step 509: At the paging moment that is indicated by the PF and the PO of the UE, a base station to which a cell in which the UE is located belongs sends the paging message to the UE, and the UE receives the paging message.

When the UE receives the paging message, the UE initiates a random access process, to establish a connection to the base station and the core network device, and the core network device sends the downlink data to the UE after the UE accesses a network. Details of this processing process are not described herein.

In this embodiment, the core network device maintains a synchronous state of radio frames and subframes of the base stations in the same paging area, so that paging moments of the UE in different paging cells are basically synchronous. Because a paging moment of a cell before reselection and a paging moment of a cell after reselection are the same in time in the same paging area, in an eDRX mechanism, even if the UE performs cell reselection, the UE does not miss a paging moment of a new cell, provided that cell reselection is completed before the paging moment arrives.

The core network device saves the paging message and delivers the paging message to the base station before the paging moment, so as to reduce a storage time of the paging message by the base station.

The UE wakes up at the first moment before the paging moment arrives to check whether to perform cell reselection, thereby ensuring that the paging moment does not appear in a cell reselection process, and avoiding that the UE misses the paging moment.

Figure 6:
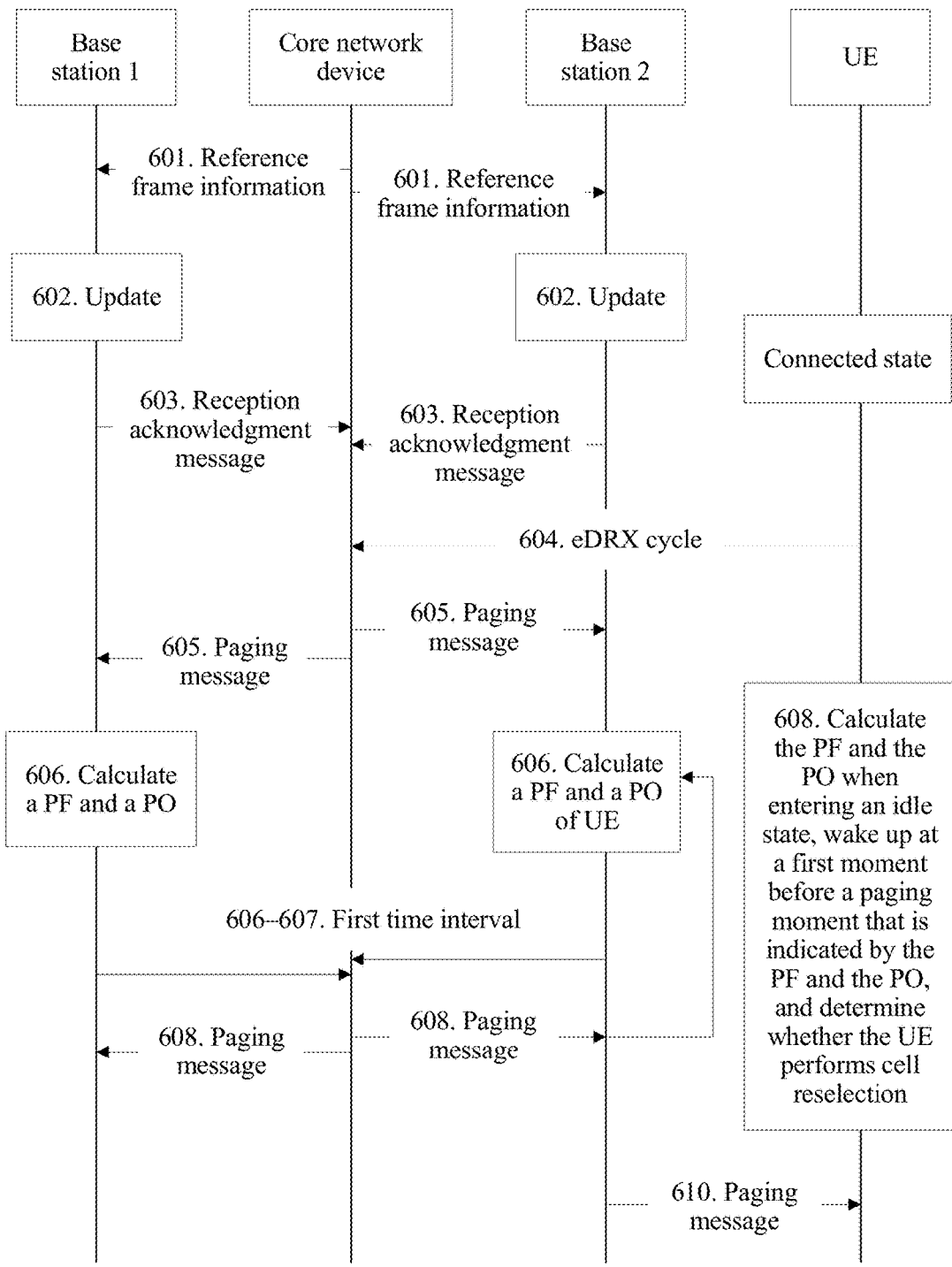
FIG. 6 is another schematic flowchart of a paging method according to an embodiment of the present invention.

FIG. 6 is a schematic flowchart of a paging method according to an embodiment of the present invention. The method includes the following steps.

Step 601: A core network device determines reference frame information when each synchronization occasion arrives, where the reference frame information includes: a radio frame number and a subframe number; and sends the reference frame information to a base station.

For implementation of this step, refer to step 501. Details are not described herein again.

Step 602: The base station receives the reference frame information, updates a frame number of a current radio frame in the base station to the radio frame number carried in the reference frame information, and updates a subframe number of the current radio frame in the base station to the subframe number carried in the reference frame information.

Step 603: The base station sends a reception acknowledgment message for the reference frame information to the core network device, and the core network device receives, within a preset time, reception acknowledgment messages sent by base stations.

The reception acknowledgment message may be a newly defined S1 interface message, or an IE that carries the reception acknowledgment message may be added to an existing control message or data message sent by the base station to the core network device.

That the base station sends the reception acknowledgment message may be negotiated and set in advance between the base station and the core network device, or may be indicated by the core network device to the base station by using the message that carries the frame information.

It may be set that if the core network device receives, within the preset time, no reception acknowledgment messages sent by one or more base stations, step 601 is triggered again until a preset maximum quantity of sending times is reached or the reception acknowledgment message sent by the base station is received.

This step is an optional step.

Step 604: The core network device receives an eDRX cycle of UE that is sent by the UE in a connected state.

The core network device may save the eDRX cycle of the UE in the core network device.

Step 605: When downlink data for the UE arrives and the UE is in an idle state, the core network device determines whether a paging message for the UE has been sent after the UE switches from the connected state to the idle state, and if no paging message for the UE has been sent, the core network device directly sends a paging message to the base station; or if a paging message for the UE has been sent, the core network device determines, according to a time at which a latest paging message for the UE is sent and the eDRX cycle of the UE, a time for sending a current paging message, and the core network device sends the paging message to the base station when the time for sending the current paging message arrives.

The paging message includes a UE identifier.

For example, the core network device has sent a paging message 1 for the UE to the base stations after the UE switches from the connected state to the idle state, and a current to-be-sent paging message is a paging message 2.

In this step, the core network device determines that the paging message 1 for the UE has been sent after the UE switches from the connected state to the idle state, and the core network device calculates, according to a time at which a latest paging message 1 is sent and the eDRX cycle of the UE and according to a formula:

Time at which the latest paging message 1 is sent+ $n$*eDRX cycle of the UE, a time nearest to a current time to send the paging message 2.

For example, the core network device has sent no paging message for the UE to the base stations after the UE switches from the connected state to the idle state, and a current to-be-sent paging message is the first paging message sent by the core network device to the base stations for the UE after the UE switches from the connected state to the idle state. In this step, the core network device determines that no paging message for the UE has been sent after the UE switches from the connected state to the idle state, and the core network device does not further calculate a time for sending the paging message, and may immediately send the paging message to the base stations.

Step 606: The base station receives the paging message, and calculates a PF and a PO of the UE according to the eDRX cycle, and the base station determines whether a time interval between a current time and a paging moment that is indicated by the PF and the PO of the UE is greater than a preset time threshold; and if the time interval is greater than the preset time threshold, sends a first time interval to the core network device, where the first time interval is less than or equal to the time interval between the paging moment of the UE and the current time, and step 607 is to be performed; or if the time interval is not greater than the preset time threshold, step 609 is to be performed.

In a possible implementation, the first time interval may be used to indicate, to the core network device, the paging moment of the UE that is calculated by the base station sending the first time interval. Specifically, when an information transmission latency and processing latency between the base station and the core network device are not considered, the first time interval may be equal to the time interval between the paging moment of the UE and the current time, and the core network device may add the current time and the first time interval to obtain the paging moment of the UE. If an information transmission latency and processing latency between the base station and the core network device are considered, the first time interval needs to be less than the time interval between the paging moment of the UE and the current time, and may be specifically: Time interval between the paging moment of the UE and the current time—Transmission latency—Processing latency, and the core network device may still add the current time and the first time interval to obtain the paging moment of the UE.

A threshold for a quantity of times of continually sending a first time interval to the core network device for a same paging message may be set for each base station. The threshold for the quantity of times may be indicated by the core network device to each base station. For example, the threshold for the quantity of times may be added to the paging message sent to the base station, or may be preset in the base station. When the threshold for the quantity of times is set for the base station, if the base station determines that the time interval between the current time and the paging moment that is indicated by the PF and the PO of the UE is greater than the preset time threshold, for this paging message received by the base station, the base station further needs to determine whether a quantity of times that the base station continually sends a first time interval to the core network device reaches the threshold for the quantity of times. If the threshold for the quantity of times is reached, step 609 is to be performed. If the threshold for the quantity of times is not reached, step 607 is to be performed.

Not all base stations that receive the paging message need to send a first time interval to the core network device, and instead, some base stations send a first time interval. Specifically, whether a base station sends a first time interval may be independently set during actual application, provided that at least one base station sends a first time interval when the time interval between the current time and the paging moment that is indicated by the PF and the PO of the UE is greater than the preset time threshold.

In a possible implementation, the paging message may include a recommended cell list or a recommended base station list. If the paging message includes the recommended cell list, a base station serving a cell listed in the recommended cell list may send a first time interval to the core network device. If the paging message includes the recommended base station list, a base station listed in the recommended base station list may send a first time interval to the core network device.

For a base station that does not send a first time interval to the core network device, when the core network device sends the paging message in step 605, or when the core network device re-sends the paging message in step 608, the base station receives the paging message, and calculates the PF and the PO of the UE according to the eDRX cycle. Then steps 609 and 610 are to be performed.

Step 607: The core network device receives the first time interval sent by the base station.

Step 608: The core network device sends a paging message to the base station according to the received first time interval; and step 606 is to be performed.

The sending, by the core network device, a paging message to the base station according to the received first time interval may include:
  for each base station, sending, by the core network device according to a first time interval sent by the base station, a paging message to the base station after the first time interval of the base station; or
  selecting, by the core network device, a minimum first time interval from first time intervals sent by base stations, and sending a paging message to the base stations after the minimum first time interval.

That is, if only one base station sends a first time interval, the core network device may send the paging message to a base station in a paging area after the first time interval of the base station; or
  if at least two base stations send a first time interval, the core network device may select a minimum first time interval, and send the paging message to a base station in a paging area after the minimum first time interval; or the core network device may send the paging message to each base station according to the first time interval of each base station.

Optionally, after the core network device sends the paging message to the base station according to the received first time interval, the method includes: for a subsequent paging message sent to the UE, calculating, by the core network device, a subsequent paging frame location of the UE based on the first time interval sent by the base station and the eDRX cycle of the UE.

That is, before the base station reports the time interval, the core network saves the paging message for the UE. For the subsequent paging message sent to the UE, the core network may calculate the subsequent paging frame location of the UE based on the first time interval that is fed back by the base station and the eDRX cycle of the UE. A specific calculation formula may be:

Paging frame location of the first time interval that is fed back by the base station+$N$*Paging eDRX cycle, where $N$ is a natural number.

Step 609: The UE calculates, when entering the idle state, the PF and the PO of the UE according to the eDRX cycle and a UE identifier, wakes up at a first moment before the paging moment that is indicated by the PF and the PO, and determines whether the UE performs cell reselection, and if cell reselection is to be performed, listens for a paging message on a paging channel of a reselected cell after cell reselection is completed; or if cell reselection is not to be performed, listens for a paging message on a paging channel of a current cell, or enters a sleep state and wakes up at the paging moment to listen for a paging channel on a paging channel of a current cell.

A time interval between the first moment and the paging moment is greater than or equal to a time that is used by the UE to complete one cell reselection.

If the frame information in step 601 includes only the radio frame number, the time interval between the first moment and the paging moment is preferably greater than or equal to a sum of a time length of one radio frame and the time that is used by the UE to complete one cell reselection.

Step 610: At the paging moment that is indicated by the PF and the PO of the UE, a base station to which a cell in which the UE is located belongs sends the paging message to the UE, and the UE receives the paging message.

When the UE receives the paging message, the UE initiates a random access process, to establish a connection to the base station and the core network device, and the core network device sends the downlink data to the UE after the UE accesses a network. Details of this processing process are not described herein.

In this embodiment, the core network device maintains a synchronous state of radio frames and subframes of the base stations in the same paging area, so that paging moments of the UE in different paging cells are basically synchronous. Because a paging moment of a cell before reselection and a paging moment of a cell after reselection are the same in time in the same paging area, in an eDRX mechanism, even if the UE performs cell reselection, the UE does not miss a paging moment of a new cell, provided that cell reselection is completed before the paging moment arrives.

The core network device saves the paging message and delivers the paging message to the base station before the paging moment, so as to reduce a storage time of the paging message by the base station.

The UE wakes up at the first moment before the paging moment arrives to check whether to perform cell reselection, thereby ensuring that the paging moment does not appear in a cell reselection process, and avoiding that the UE misses the paging moment.

Figure 7:
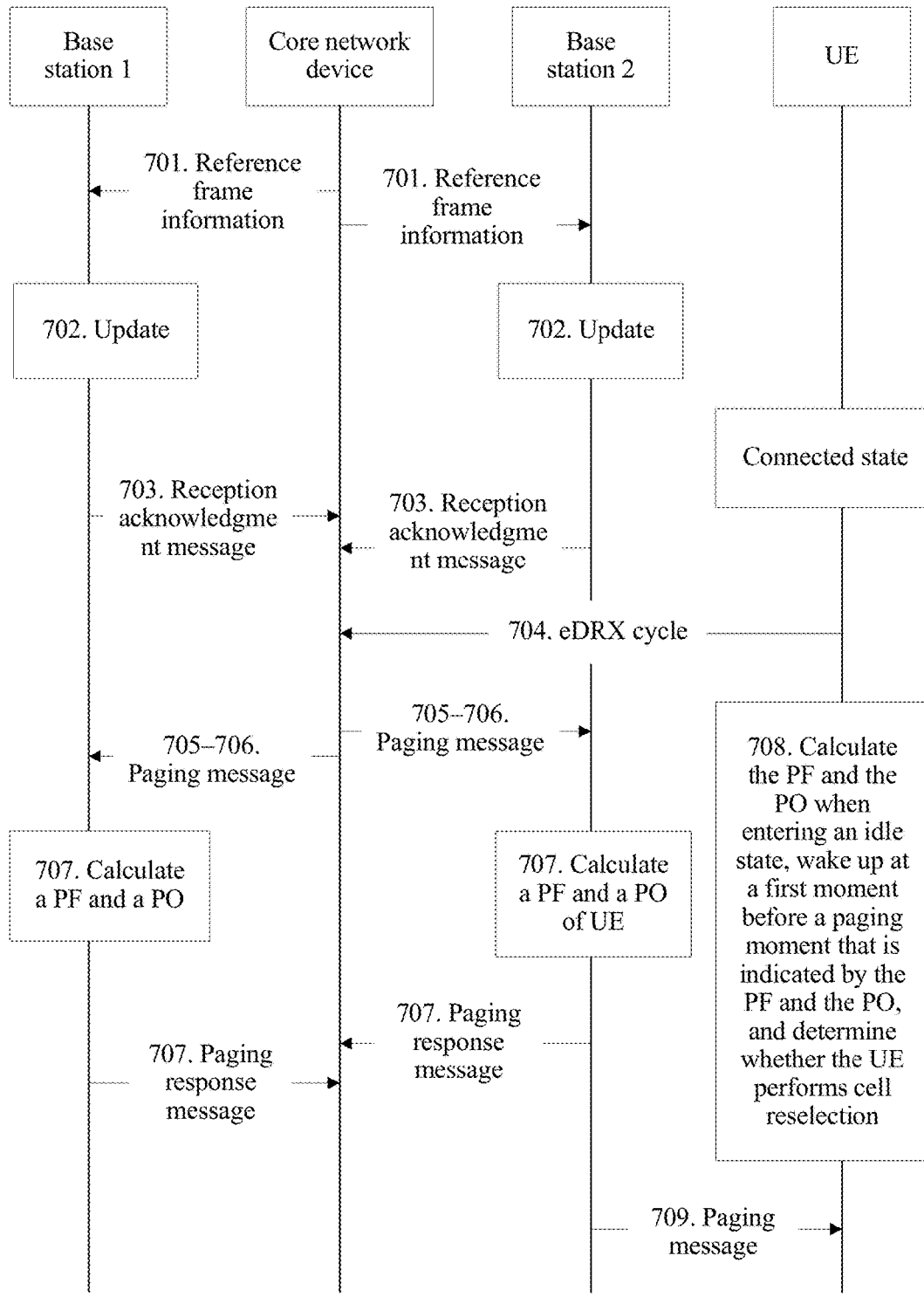
FIG. 7 is another schematic flowchart of a paging method according to an embodiment of the present invention.

Referring to FIG. 7, FIG. 7 is a schematic flowchart of a paging method according to an embodiment of the present invention. The method includes the following steps.

Step 701: A core network device determines reference frame information when each synchronization occasion arrives, where the reference frame information includes: a radio frame number and a subframe number; and sends the reference frame information to a base station.

For implementation of this step, refer to step 501. Details are not described herein again.

Step 702: The base station receives the reference frame information, updates a frame number of a current radio frame in the base station to the radio frame number carried in the reference frame information, and updates a subframe number of the current radio frame in the base station to the subframe number carried in the reference frame information.

Step 703: The base station sends a reception acknowledgment message for the reference frame information to the core network device, and the core network device receives, within a preset time, reception acknowledgment messages sent by base stations.

The reception acknowledgment message may be a newly defined S1 interface message, or an IE that carries the reception acknowledgment message may be added to an existing control message or data message sent by the base station to the core network device.

That the base station sends the reception acknowledgment message may be negotiated and set in advance between the base station and the core network device, or may be indicated by the core network device to the base station by using the message that carries the frame information.

It may be set that if the core network device receives, within the preset time, no reception acknowledgment messages sent by one or more base stations, step 701 is triggered again until a preset maximum quantity of sending times is reached or the reception acknowledgment message sent by the base station is received.

This step is an optional step.

Step 704: The core network device receives an eDRX cycle of UE that is sent by the UE in a connected state.

The core network device may save the eDRX cycle of the UE in the core network device.

Step 705: When downlink data for the UE arrives and the UE is in an idle state, the core network device determines whether a paging message for the UE has been sent after the UE switches from the connected state to the idle state, and if no paging message for the UE has been sent, the core network device directly sends a paging message to the base station, and step 707 is to be performed; or if a paging message for the UE has been sent, step 706 is to be performed.

Step 706: The core network device determines, according to a time at which a latest paging message for the UE is sent, the eDRX cycle, and second time intervals corresponding to the latest paging message sent for the UE, a time for sending a current paging message, and the core network device sends the paging message to the base station when the time for sending the current paging message arrives, and step 707 is to be performed.

The second time intervals corresponding to the latest paging message sent for the UE are: second time intervals carried in paging response messages that are correspondingly fed back by the base stations when the core network device sends the latest paging message for the UE.

The determining, by the core network device according to a time at which a latest paging message for the UE is sent, the eDRX cycle, and second time intervals corresponding to the latest paging message sent for the UE, a time for sending a current paging message may include:

selecting, by the core network device, a second time interval that has a minimum value from the second time intervals; and determining, by the core network device according to the following formula, the time for sending the current paging message:

Time for sending the current paging message=Time at which the latest paging message for the UE is sent+$M$*eDRX cycle+Second time interval that has the minimum value, where M is a natural number, and m preferably has such a value that the calculated time for sending the current paging message exceeds a current time and is nearest to the current time.

If a transmission latency and a processing latency between the base station and the core network device are not considered for the second time interval that is fed back by the base station, the time that is calculated in the foregoing formula for sending the current paging message may be modified by subtracting the transmission latency and the processing latency. If a transmission latency and a processing latency between the base station and the core network device are considered for the second time interval that is fed back by the base station, the time that is calculated in the foregoing formula for sending the current paging message does not need to be modified.

Step 707: The base station receives the paging message, calculates the PF and the PO of the UE according to the eDRX cycle, and sends a paging response message to the core network device, where the paging response message includes a second time interval, and the second time interval is used to indicate, to the core network device, a paging moment that is indicated by the PF and the PO of the UE.

If the transmission latency and the processing latency between the base station and the core network device are not considered, the second time interval may be equal to the time interval between the current time and the paging moment that is indicated by the PF and the PO of the UE. If the transmission latency and the processing latency between the base station and the core network device are considered, the second time interval may be less than the time interval between the current time and the paging moment that is indicated by the PF and the PO of the UE, and may be specifically: Time interval between the current time and the paging moment that is indicated by the PF and the PO of the UE—Transmission latency—Processing latency.

Step 708: The UE calculates, when entering the idle state, the PF and the PO of the UE according to the eDRX cycle and a UE identifier, wakes up at a first moment before the paging moment that is indicated by the PF and the PO, and determines whether the UE performs cell reselection, and if cell reselection is to be performed, listens for a paging message on a paging channel of a reselected cell after cell reselection is completed; or if cell reselection is not to be performed, listens for a paging message on a paging channel of a current cell, or enters a sleep state and wakes up at the paging moment to listen for a paging channel on a paging channel of a current cell.

A time interval between the first moment and the paging moment is greater than or equal to a time that is used by the UE to complete one cell reselection.

If the frame information in step 701 includes only the radio frame number, the time interval between the first moment and the paging moment is preferably greater than or equal to a sum of a time length of one radio frame and the time that is used by the UE to complete one cell reselection.

Step 709: At the paging moment that is indicated by the PF and the PO of the UE, a base station to which a cell in which the UE is located belongs sends the paging message to the UE, and the UE receives the paging message.

When the UE receives the paging message, the UE initiates a random access process, to establish a connection to the base station and the core network device, and the core network device sends the downlink data to the UE after the UE accesses a network. Details of this processing process are not described herein.

In this embodiment, the core network device maintains a synchronous state of radio frames and subframes of the base stations in the same paging area, so that paging moments of the UE in different paging cells are basically synchronous. Because a paging moment of a cell before reselection and a paging moment of a cell after reselection are the same in time in the same paging area, in an eDRX mechanism, even if the UE performs cell reselection, the UE does not miss a paging moment of a new cell, provided that cell reselection is completed before the paging moment arrives.

The core network device saves the paging message and delivers the paging message to the base station before the paging moment, so as to reduce a storage time of the paging message by the base station.

The UE wakes up at the first moment before the paging moment arrives to check whether to perform cell reselection, thereby ensuring that the paging moment does not appear in a cell reselection process, and avoiding that the UE misses the paging moment.

Figure 8:
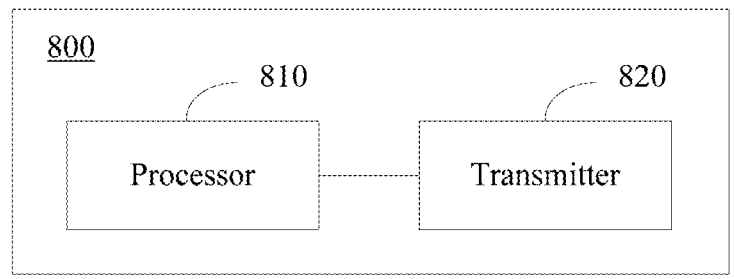
FIG. 8 is a schematic structural diagram of a core network device according to an embodiment of the present invention.

Corresponding to the foregoing method, an embodiment of the present invention provides a core network device. Referring to FIG. 8, a core network device 800 includes:

a processor 810, configured to determine, by the core network device, reference frame information when determining that a synchronization occasion arrives, where the reference frame information includes a radio frame number; and a transmitter 820, configured to send the reference frame information determined by the processor to a base station in a paging area, so that the base station synchronizes a radio frame in the base station according to the reference frame information.

Optionally, the processor is specifically configured to:
determine that a new base station in the paging area connects to the core network device; or
determine that a base station in the paging area restarts and then reconnects to the core network device; or
determine that a synchronization moment of each synchronization cycle arrives; or
receive a synchronization request message sent by at least one base station in the paging area.

Optionally, the processor is specifically configured to:
pre-store an initial radio frame number;
calculate an absolute time deviation between a current time and an initial moment, where the initial moment is an initial moment of a radio frame indicated by the radio frame number; and
determine the absolute time deviation and the initial radio frame number as the reference frame information.

Optionally, the processor is specifically configured to:
pre-store an initial radio frame number;
continually update the stored radio frame number to a frame number of a current radio frame of the core network device according to a time length of one radio frame; and
read the radio frame number stored in the core network device.

Optionally, the frame information further includes a subframe number; and the processor is specifically configured to:
pre-store an initial radio frame number and subframe number;
continually update the stored radio frame number to a frame number of a current radio frame and update the stored subframe number to a subframe number of a current subframe in the current radio frame according to time lengths of a system paging frame and a subframe; and
read the radio frame number and the subframe number that are stored in the core network device.

Optionally, the core network device further includes:
a receiver, configured to receive frame information of a first base station that is sent by the first base station, where the frame information includes: a radio frame number of the first base station when the first base station sends the frame information; and the first base station is a base station in the paging area.

The processor is further configured to determine the frame information of the first base station as the reference frame information.

Optionally, the core network device further includes:
a receiver, configured to receive frame information of a first base station that is sent by the first base station, where the frame information includes: a radio frame number and a subframe number of the first base station when the first base station sends the frame information; and the first base station is a base station in the paging area.

The processor is further configured to determine the frame information of the first base station as the reference frame information.

Optionally, the transmitter is further configured to send a frame information request to the first base station before the receiver receives the frame information of the first base station.

Optionally, the core network device further includes:
the receiver is configured to receive a reception acknowledgment message that is sent by the base station after the base station receives the frame information.

Optionally, the core network device further includes:
the receiver is configured to receive an eDRX cycle of UE that is sent by the UE in a connected state.

The processor is further configured to calculate a PF and a PO of the UE according to the eDRX cycle.

The transmitter is further configured to: when downlink data for the UE arrives and the UE is in an idle state, send a paging message to the base station before a paging moment that is indicated by the PF and the PO, so that the base station sends the paging message to the UE.

Optionally, a moment at which the core network device sends the paging message to the base station is nearer to the paging moment between a moment at which the PF and the PO are calculated and the paging moment.

Optionally, the core network device further includes:
the receiver is configured to receive an eDRX cycle of UE that is sent by the UE in a connected state.

The transmitter is configured to: when downlink data for the UE arrives and the UE is in an idle state, send a paging message to the base station. The paging message includes the eDRX cycle of the UE.

The receiver is further configured to receive a first time interval sent by the base station. The first time interval is sent by the base station when the base station calculates a PF and a PO of the UE according to the eDRX cycle and determines that a time interval between a current time and a paging moment that is indicated by the PF and the PO of the UE is greater than a preset time threshold. The first time interval is less than or equal to the time interval between the paging moment of the UE and the current time.

The transmitter is further configured to send a paging message to the base station according to the received first time interval.

Optionally, the transmitter is specifically configured to: for each base station, send, according to a first time interval sent by the base station, a paging message to the base station after the first time interval of the base station; or
select a minimum first time interval from first time intervals sent by base stations, and send a paging message to the base stations after the minimum first time interval.

Optionally, the transmitter is specifically configured to:
immediately send the paging message to the base station when it is determined that no paging message for the UE has been sent after the UE switches from the connected state to the idle state; or
when it is determined that a paging message for the UE has been sent after the UE switches from the connected state to the idle state, determine, according to a time at which a latest paging message for the UE is sent and the eDRX cycle of the UE, a time for sending a current paging message, and send the paging message to the base station when the time for sending the current paging message arrives.

Optionally, the transmitter is specifically configured to:
immediately send the paging message to the base station when it is determined that no paging message for the UE has been sent after the UE switches from the connected state to the idle state; or
when it is determined that a paging message for the UE has been sent after the UE switches from the connected state to the idle state, determine, according to a pre-stored reference sending time and reference time interval and the eDRX cycle of the UE, a time for sending a current paging message, and send, by the core network device, the paging message to the base station when the time for sending the current paging message arrives.

Optionally, the processor is further configured to:
each time the paging message is sent, if the first time interval sent by the base station is received, update the reference sending time by using a time at which the paging message is sent, and update the reference time interval by using the received first time interval.

Optionally, the core network device further includes:
the receiver is configured to receive an eDRX cycle of UE that is sent by the UE in a connected state.

The processor is further configured to: when downlink data for the UE arrives and the UE is in an idle state, and when it is determined that a paging message for the UE has been sent after the UE switches from the connected state to the idle state, determine, according to a time at which a latest paging message for the UE is sent, the eDRX cycle of the UE, and second time intervals corresponding to the latest paging message sent for the UE, a time for sending a current paging message.

The transmitter is further configured to: immediately send the paging message to the base station when the downlink data for the UE arrives and the UE is in the idle state, and when it is determined that no paging message for the UE has been sent after the UE switches from the connected state to the idle state; or when the downlink data for the UE arrives and the UE is in the idle state, and when it is determined that the paging message for the UE has been sent after the UE switches from the connected state to the idle state, send the paging message to the base station when the time for sending the current paging message arrives.

The second time intervals corresponding to the latest paging message sent for the UE are: second time intervals carried in paging response messages that are correspondingly fed back by base stations when the core network device sends the latest paging message for the UE.

The second time intervals are used to indicate, to the core network device, paging moments of the UE that are calculated by the base stations.

Optionally, the processor is specifically configured to select a second time interval that has a minimum value from the second time intervals; and determine, according to the following formula, the time for sending the current paging message:

Time for sending the current paging message=Time at which the latest paging message for the UE is sent+$M$*eDRX cycle+Second time interval that has the minimum value, where M is a natural number.

In this embodiment, the core network device sends current reference frame information of the core network device to the base station, so that the base station updates the radio frame in the base station according to the reference frame information. The reference frame information includes the radio frame number. In this way, at least radio frame numbers are synchronous between the core network device and the base station, and a time difference between the core network device and the base station is limited to the time length of one radio frame, thereby decreasing a time error between cells of different base stations as much as possible, and reducing, to some extent, problems that the UE still misses a paging moment of a new cell even though cell reselection is completed before a paging moment of a current cell.

Figure 9:
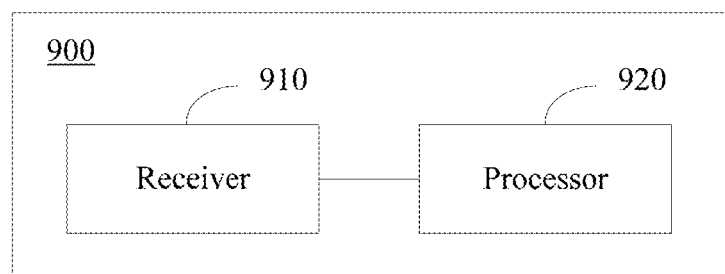
FIG. 9 is a schematic structural diagram of a base station according to an embodiment of the present invention.

An embodiment of the present invention further provides a base station 900. Referring to FIG. 9, the base station 900 includes:
- a receiver 910, configured to receive reference frame information sent by a core network device, where the reference frame information includes a radio frame number; and
- a processor 920, configured to synchronize a radio frame in the base station according to the reference frame information received by the receiver.

Optionally, the processor is specifically configured to:
calculate, according to an absolute time deviation and a length of one radio frame, a quantity of radio frames included in the absolute time deviation and a remaining time deviation;
calculate, according to the remaining time deviation and a length of one subframe, a quantity of subframes included in the remaining time deviation; and
add an initial radio frame number and the quantity of radio frames to obtain a frame number of a current radio frame, and determine a subframe number of a current subframe in the current radio frame according to the quantity of subframes.

Optionally, the processor is specifically configured to:
update a frame number of a current radio frame in the base station to the radio frame number carried in the reference frame information.

Optionally, the frame information further includes a subframe number; and the processor is specifically configured to:
update a frame number of a current radio frame in the base station to the radio frame number carried in the reference frame information, and update a subframe number of the current radio frame in the base station to the subframe number carried in the reference frame information.

Optionally, the base station further includes:
a transmitter, configured to send a reception acknowledgment message for the reference frame information to the core network device.

Optionally, the base station further includes:
the receiver is further configured to receive a paging message sent by the core network device.

The processor is further configured to calculate a PF and a PO of UE according to an eDRX cycle and a UE identifier that are carried in the paging message.

The transmitter is further configured to send the paging message for the UE at a paging moment that is indicated by the PF and the PO of the UE.

Optionally, the base station further includes:
the receiver is further configured to receive a paging message sent by the core network device.

The processor is further configured to: calculate a PF and a PO of UE according to an eDRX cycle and a UE identifier that are carried in the paging message; and determine a first time interval when determining that a time interval between a current time and a paging moment that is indicated by the PF and the PO is greater than a preset time threshold.

The transmitter is further configured to send the determined first time interval to the core network device. The first time interval is less than or equal to the time interval between the paging moment and the current time.

The receiver is further configured to receive a paging message for the UE that is sent by the core network device according to the first time interval.

Optionally, the processor is further configured to:
obtain a recommended cell list in the paging message received by the receiver, and determine that the base station is a base station serving a cell listed in the recommended cell list; or
obtain a recommended base station list in the paging message received by the receiver, and determine that the base station is a base station listed in the recommended cell list.

Optionally, the base station further includes:
the receiver is further configured to receive a paging message sent by the core network device.

The processor is further configured to: calculate a PF and a PO of UE according to an eDRX cycle and a UE identifier that are carried in the paging message; and determine a second time interval according to a time interval between a current time and a paging moment that is indicated by the PF and the PO.

The base station further includes: a transmitter, configured to add the second time interval to a paging response message, and send the paging response message to the core network device. The second time interval is used to indicate, to the core network device, the paging moment that is indicated by the PF and the PO.

Optionally, the transmitter is further configured to send a synchronization request message to the core network device when the processor determines that a time between a current moment and a moment at which latest reference frame information is received exceeds a preset cycle value. The synchronization request message is used to request the core network device to send current frame information.

In this embodiment, the base station receives the reference frame information sent by the core network device. The reference frame information includes the radio frame number. The base station synchronizes the radio frame in the base station according to the reference frame information. In this way, at least radio frame numbers are synchronous between the core network device and the base station, and a time difference between the core network device and the base station is limited to the time length of one radio frame, thereby decreasing a time error between cells of different base stations as much as possible, and reducing, to some extent, problems that the UE still misses a paging moment of a new cell even though cell reselection is completed before a paging moment of a current cell.

Figure 10:
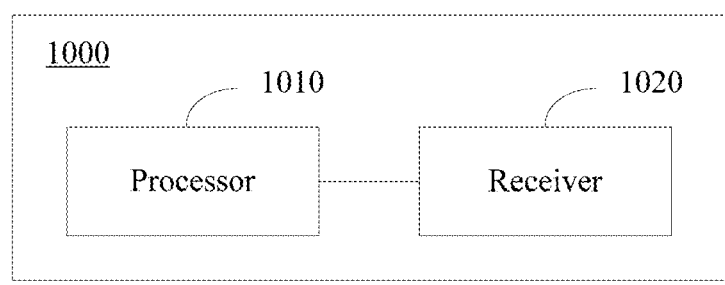
FIG. 10 is a schematic structural diagram of user equipment according to an embodiment of the present invention.

An embodiment of the present invention further provides user equipment 1000. As shown in FIG. 10, the user equipment 1000 includes:

- a processor 1010, configured to calculate a PF and a PO of the user equipment when the user equipment enters an idle state; and wake up the user equipment at a first moment before a paging moment that is indicated by the PF and the PO, and determine whether the user equipment performs cell reselection, where a time interval between the first moment and the paging moment is greater than or equal to a time that is used by the user equipment to complete one cell reselection; and if cell reselection is to be performed, complete cell reselection; and
- a receiver 1020, configured to: when the processor determines that cell reselection is to be performed, listen for a paging message on a paging channel of a reselected cell; or when the processor determines that cell reselection is not to be performed, listen for a paging message on a paging channel of a current cell, or enter a sleep state and wake up at the paging moment to listen for a paging message on a paging channel of a current cell.

Optionally, the time interval between the first moment and the paging moment is greater than or equal to a sum of a time length of one radio frame and the time that is used by the user equipment to complete one cell reselection.

In this embodiment, the UE calculates the PF and the PO when entering the idle state, wakes up at the first moment before the paging moment that is indicated by the PF and the PO, and determines whether the UE performs cell reselection. The time interval between the first moment and the paging moment is greater than or equal to the time that is used by the UE to complete one cell reselection. If cell reselection is to be performed, the UE listens for the paging message on the paging channel of the reselected cell after cell reselection is completed.

If cell reselection is not to be performed, the UE listens for the paging message on the paging channel of the current cell, or enters the sleep state and wakes up at the paging moment to listen for the paging channel on the paging channel of the current cell. In this way, it is ensured as far as possible that the UE completes cell reselection before the paging moment of the current cell, in combination with the foregoing synchronization of at least radio frame numbers between the core network device and the base station, thereby reducing, to some extent, problems that the UE still misses a paging moment of a new cell even though cell reselection is completed before the paging moment of the current cell.

A person skilled in the art may clearly understand that, the technologies in the embodiments of the present invention may be implemented by software in addition to a necessary general hardware platform. Based on such an understanding, the technical solutions in the embodiments of the present invention essentially or the part contributing to the prior art may be implemented in a form of a software product. The software product is stored in a storage medium, such as a ROM/RAM, a magnetic disk, or an optical disc, and includes several instructions for instructing a computer device (which may be a personal computer, a server, a network device, or the like) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly. For related parts, refer to partial descriptions in the method embodiment.

The foregoing descriptions are implementations of the present invention, but are not intended to limit the protection scope of the present invention. Any modification, equivalent replacement, and improvement made without departing from the spirit and principle of the present invention shall fall within the protection scope of the present invention.

What is claimed is:

1. A paging method, comprising:
    determining, by a core network device, that a synchronization occasion arrives;
    in response to determining that the synchronization occasion arrives, determining, by the core network device, reference frame information, wherein the reference frame information comprises a radio frame number, and wherein the determining, by the core network device, reference frame information comprises:
        pre-storing, by the core network device, an initial radio frame number;
        calculating, by the core network device, an absolute time deviation between a current time and an initial moment, wherein the initial moment is an initial moment of a radio frame indicated by the radio frame number; and
        determining, by the core network device, the absolute time deviation and the initial radio frame number as the reference frame information; and
    sending, by the core network device, the reference frame information to a base station in a paging area, wherein the reference frame information is used by the base station to synchronize a radio frame in the base station.

2. The method according to claim 1, wherein determining that the synchronization occasion arrives comprises:
    determining, by the core network device, that a new base station in the paging area connects to the core network device; or
    determining, by the core network device, that the base station in the paging area restarts and then reconnects to the core network device; or
    determining, by the core network device, that a synchronization moment of each synchronization cycle arrives; or
    receiving, by the core network device, a synchronization request message sent by at least one base station in the paging area.

3. The method according to claim 1, wherein after the sending, by the core network device, the reference frame information to the base station, the method further comprises:
    receiving, by the core network device, a reception acknowledgment message that is sent by the base station after the base station receives the reference frame information.

4. The method according to claim 1, further comprising:
    receiving, by the core network device, an extended discontinuous reception (eDRX) cycle of user equipment (UE) that is sent by the UE in a connected state;
    calculating a paging frame (PF) and a paging occasion (PO) of the UE according to the eDRX cycle; and
    when downlink data for the UE arrives and the UE is in an idle state, sending, by the core network device, a paging message to the base station before a paging moment that is indicated by the PF and the PO.

5. A core network device, comprising:
a non-transitory memory storage comprising instructions; and
one or more hardware processors in communication with the non-transitory memory storage, wherein the one or more hardware processors execute the instructions to:
   determine that a synchronization occasion arrives; and
   in response to determining that the synchronization occasion arrives, determine reference frame information, wherein the reference frame information comprises a radio frame number, and wherein the one or more hardware processors execute the instructions to determine reference frame information comprises the one or more hardware processors execute the instructions to:
      pre-store an initial radio frame number;
      calculate an absolute time deviation between a current time and an initial moment, wherein the initial moment is an initial moment of a radio frame indicated by the radio frame number; and
      determine the absolute time deviation and the initial radio frame number as the reference frame information; and
a transmitter, configured to send the reference frame information determined by the one or more hardware processors to a base station in a paging area, wherein the reference frame information is used by the base station to synchronize a radio frame in the base station.

6. The core network device according to claim 5, wherein the one or more hardware processors execute the instructions to:
   determine that a new base station in the paging area connects to the core network device; or
   determine that the base station in the paging area restarts and then reconnects to the core network device; or
   determine that a synchronization moment of each synchronization cycle arrives; or
   receive a synchronization request message sent by at least one base station in the paging area.

7. The core network device according to claim 5, further comprising:
   a receiver, configured to receive a reception acknowledgment message that is sent by the base station after the base station receives the reference frame information.

8. The core network device according to claim 5, further comprising:
   a receiver, configured to receive an extended discontinuous reception (eDRX) cycle of user equipment (UE) that is sent by the UE in a connected state; and
   wherein the one or more hardware processors execute the instructions to calculate a paging frame (PF) and a paging occasion (PO) of the UE according to the eDRX cycle; and
   the transmitter is configured to transmit, when downlink data for the UE arrives and the UE is in an idle state, a paging message to the base station before a paging moment that is indicated by the PF and the PO.

9. A non-transitory computer-readable medium storing computer instructions for paging, that when executed by one or more hardware processors, cause the one or more hardware processors to perform operations comprising:
   determining, by a core network device, that a synchronization occasion arrives;
   in response to determining that the synchronization occasion arrives, determining, by the core network device, reference frame information, wherein the reference frame information comprises a radio frame number, and wherein the determining, by the core network device, reference frame information comprises:
      pre-storing, by the core network device, an initial radio frame number;
      calculating, by the core network device, an absolute time deviation between a current time and an initial moment, wherein the initial moment is an initial moment of a radio frame indicated by the radio frame number; and
      determining, by the core network device, the absolute time deviation and the initial radio frame number as the reference frame information; and
   sending, by the core network device, the reference frame information to a base station in a paging area, wherein the reference frame information is used by the base station to synchronize a radio frame in the base station.

10. The non-transitory computer-readable medium according to claim 9, wherein determining that the synchronization occasion arrives comprises:
   determining, by the core network device, that a new base station in the paging area connects to the core network device; or
   determining, by the core network device, that the base station in the paging area restarts and then reconnects to the core network device; or
   determining, by the core network device, that a synchronization moment of each synchronization cycle arrives; or
   receiving, by the core network device, a synchronization request message sent by at least one base station in the paging area.

11. The non-transitory computer-readable medium according to claim 9, wherein the operations further comprise:
   after the sending, by the core network device, the reference frame information to the base station, receiving, by the core network device, a reception acknowledgment message that is sent by the base station after the base station receives the reference frame information.

12. The non-transitory computer-readable medium according to claim 9, wherein the operations further comprise:
   receiving, by the core network device, an extended discontinuous reception (eDRX) cycle of user equipment (UE) that is sent by the UE in a connected state;
   calculating a paging frame (PF) and a paging occasion (PO) of the UE according to the eDRX cycle; and
   when downlink data for the UE arrives and the UE is in an idle state, sending, by the core network device, a paging message to the base station before a paging moment that is indicated by the PF and the PO.

* * * * *